(12) United States Patent
Okabayashi et al.

(10) Patent No.: US 7,380,112 B2
(45) Date of Patent: May 27, 2008

(54) PROCESSOR AND COMPILER FOR DECODING AN INSTRUCTION AND EXECUTING THE DECODED INSTRUCTION WITH CONDITIONAL EXECUTION FLAGS

(75) Inventors: Hazuki Okabayashi, Hirakata (JP); Tetsuya Tanaka, Soraku-gun (JP); Taketo Heishi, Osaka (JP); Hajime Ogawa, Suita (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 284 days.

(21) Appl. No.: 10/805,381

(22) Filed: Mar. 22, 2004

(65) Prior Publication Data
US 2004/0193859 A1 Sep. 30, 2004

(30) Foreign Application Priority Data
Mar. 24, 2003 (JP) .............................. 2003-081132

(51) Int. Cl.
G06F 7/38 (2006.01)
G06F 9/00 (2006.01)
G06F 9/44 (2006.01)
G06F 15/00 (2006.01)

(52) U.S. Cl. ..................................................... 712/241
(58) Field of Classification Search ................. 712/241
See application file for complete search history.

(56) References Cited

U.S. PATENT DOCUMENTS 6,449,713 B1* 9/2002 Emer et al. .................. 712/234
6,629,238 B1* 9/2003 Arora et al. ................. 712/241
2002/0091996 A1 7/2002 Topham

FOREIGN PATENT DOCUMENTS

EP 1 164 471 12/2001
JP 2002-024011 1/2002

OTHER PUBLICATIONS

Mitsuru Ikei, IA-64 Processor Basic Course, Tokyo, Ohmsha Ltd., 1999, Fig. 4.32 of p. 129 and English translation of Fig. 4.32.

(Continued)

*Primary Examiner*—Richard L. Ellis
*Assistant Examiner*—Brian P Johnson
(74) *Attorney, Agent, or Firm*—Wenderoth, Lind & Ponack, L.L.P.

(57) ABSTRACT

The present invention provides a processor which has a small-scale circuit and is capable of executing loop processing at a high speed while consuming a small amount of power. When the processor decodes an instruction "jloop C6,C1:C4,TAR,Ra", the processor (i) sets a conditional flag C4 to 0 when the value of a register Ra is smaller than 0, (ii) moves the value of a conditional flag C2 to a conditional flag C1, moves the value of a conditional flag C3 to the conditional flag C2, and moves the value of the conditional flag C4 to the conditional flags C3 and C6, (iii) adds −1 to the register Ra and stores the result into the register Ra, and (iv) branches to an address specified by a branch register (TAR). When not filled with a branch target instruction, the jump buffer will be filled with a branch target instruction.

18 Claims, 60 Drawing Sheets jloop C6,C2:C4,TAR,Ra

| Behavior | => jloop C6,C2:C4,TAR,Ra,-1<br><br>PC <- TAR;<br>C2 <- C3, C3 <- C4, C6 <- C4;<br>C4 <- (Ra >= 0)? 1 : 0;<br>Ra <- Ra - sext(1);<br><br>Used as part of loop. Following processing is performed:<br>(1) Move C3 to C2, and C4 to C3 and C6.<br>(2) Add -1 to Ra, and store result in Ra. Set 0 to C4 when value held in Ra becomes smaller than 0.<br>(3) Branch to address stored in TAR. Fill branch destination instruction, if there is no branch destination instruction filled in branch destination buffer. |
|---|---|

| Assembler mnemonic | Format | Affecting flag | Affected flag |
|---|---|---|---|
| jloop C6,C2:C4,TAR,Ra | 32bit synonym | C2,C4,C6,C3 | — |
| Remarks | | | |
|  | | | |

OTHER PUBLICATIONS

European Search Report issued Dec. 27, 2007 in the corresponding European Application No. 04006078.2.

Warter et al., "The Benefit of Predicated Execution for Software Pipelining", *System Sciences*, vol. 1, pp. 497-506, 1993.

Adams et al., "A Parallel Pipelined Processor with Conditional Instruction Execution", *Computer Architecture News*, vol. 19, No. 1, pp. 135-142, 1991.

* cited by examiner

Fig. 11

| Bit | 31 | 30 | 29 | 28 | 27 | 26 | 25 | 24 |
|---|---|---|---|---|---|---|---|---|
| Bit name | reserved | SWE | FXP | reserved | IH | EH | PL | |
| Bit | 23 | 22 | 21 | 20 | 19 | 18 | 17 | 16 |
| Bit name | FIE3 | FIE2 | FIE1 | FIE0 | reserved | reserved | AEE | IE |
| Bit | 15 | 14 | 13 | 12 | 11 | 10 | 9 | 8 |
| Bit name | reserved | | | | | | | |
| Bit | 7 | 6 | 5 | 4 | 3 | 2 | 1 | 0 |
| Bit name | IM[7:0] | | | | | | | |

| Bit | 31 | 30 | 29 | 28 | 27 | 26 | 25 | 24 |
|---|---|---|---|---|---|---|---|---|
| Bit name | ALN | ALN | reserved | BPO | BPO | BPO | BPO | BPO |
| Bit | 23 | 22 | 21 | 20 | 19 | 18 | 17 | 16 |
| Bit name | reserved | reserved | reserved | reserved | VC3 | VC2 | VC1 | VC0 |
| Bit | 15 | 14 | 13 | 12 | 11 | 10 | 9 | 8 |
| Bit name | reserved | reserved | reserved | reserved | reserved | reserved | reserved | reserved |
| Bit | 7 | 6 | 5 | 4 | 3 | 2 | 1 | 0 |
| Bit name | reserved | reserved | reserved | reserved | reserved | reserved | OVS | CAS |
| Bit | C7 | C6 | C5 | C4 | C3 | C2 | C1 | C0 |
| Bit name | C7 | C6 | C5 | C4 | C3 | C2 | C1 | C0 |

| Category | SIMD | Size | Instruction | Operand | CFR | PSR | Typical behavior | Operation unit | 31 16 |
|---|---|---|---|---|---|---|---|---|---|
| ALU add system | SINGLE | Word | add | Rc,Ra,Rb<br>Rb,Ra,i12s<br>SP,i19s<br>Ra2,Rb2<br>Rc3,Ra3,Rb3<br>Ra2,i05s<br>SP,i11s | | | | | 32<br><br>16<br><br>32<br>16 |
| | | | addu | Rb,GP,i16u<br>Rb,SP,i16u<br>Ra3,SP,i08u | | | | A | 32 |
| | | | addc | Rc,Ra,Rb | W:cas,c0:c1 | | Addition with carry | | |
| | | | addvw | Rc,Ra,Rb | W:ovs | | Addition with overflow | | |
| | | | adds | Rc,Ra,Rb | | | Ra + Rb + 1 → Rc  (>>1) | | |
| | | | addsr | Rc,Ra,Rb | | | Ra + Rb + 1 → Rc  (>>1) | | |
| | | | s1add | Rc,Ra,Rb<br>Rc3,Ra3,Rb3 | | | Ra + Rb → Rc  (>>1) | | 16<br>32 |
| | | | s2add | Rc,Ra,Rb<br>Rc3,Ra3,Rb3 | | | Ra + Rb → Rc  (>>2) | | 16 |
| | | | addmsk | Rc,Ra,Rb | R:BP0 | | Ra [CFR BP +] Rb → Rc | | 32 |
| | | | addarvw | Rc,Ra,Rb | W:ovs | | | | |
| | | Half word | faddvh | Rc,Ra,Rb | | | | | |

Fig. 21B

| Category | SIMD | Size | Instruction | Operand | CFR | PSR | Typical behavior | Operation unit | 31 16 |
|---|---|---|---|---|---|---|---|---|---|
| ALU add system | SIMD | Half word | vaddh | Rc,Ra,Rb | | | Ra 16 + 16 → Rc 16 16 | A | 32 |
| | | | vaddhvh | Rc,Ra,Rb | W:ovs | | Rb 16 + 16 → Rb 16 | | |
| | | | vsaddh | Rb,Ra,i08s | | | +Immediate +Immediate value value | | |
| | | | vaddsh | Rc,Ra,Rb | | | Ra 16 + 16 →>>1 >>1 Rc 16 16 | | |
| | | | vaddsrh | Rc,Ra,Rb | | | (+1) (+1) (With rounding) | | |
| | | | vaddhvc vaddrhvc | Rc,Ra,Rb Rc,Ra,Rb | R:VC | | | | |
| | | | vxaddh | Rc,Ra,Rb | | | Ra 16 + 16 → Rc 16 16 | | |
| | | | vxaddhvh | Rc,Ra,Rb | W:ovs | | Rb 16 + 16 | | |
| | | | vhaddh | Rc,Ra,Rb | | | Ra 16 + 16 → Rc 16 Rb 16 | | |
| | | | vhaddhvh | Rc,Ra,Rb | W:ovs | | | | |
| | | | vladdh | Rc,Ra,Rb | | | Ra 16 + 16 → Rc 16 Rb 16 | | |
| | | | vladdhvh | Rc,Ra,Rb | W:ovs | | | | |
| | | Byte | vaddb | Rc,Ra,Rb | | | Ra 8 8 8 8 + + + + → Rc 8 8 8 8 Rb 8 8 8 8 | | |
| | | | vsaddb | Rb,Ra,i08s | | | (Immediate value) | | |
| | | | vaddsb | Rc,Ra,Rb | | | Ra 8 8 8 8 + + + + →>>1 >>1 Rc 8 8 8 8 Rb 8 8 8 8 >>1 >>1 | | |
| | | | vaddsrb | Rc,Ra,Rb | | | (+1)(+1)(+1)(+1) (With rounding) | | |

Fig. 22A

| Category | SIMD | Size | Instruction | Operand | CFR | PSR | Typical behavior | Operation unit | 31 16 |
|---|---|---|---|---|---|---|---|---|---|
| ALU sub system | SINGLE | Word | sub | Rc,Rb,Ra Rb2,Ra2 Rc3,Rb3,Ra3 | | | Immediate value (Ra − Rb2) → Rb | A | 32 16 32 16 |
| | | | rsub | Rb,Ra,i08s Ra2,Rb2 Ra2,i04s | | | | | |
| | | | subc | Rc,Rb,Ra | W:cas,c0:c1 | | With carry | | |
| | | | subvw | Rc,Rb,Ra | W:ovs | | With overflow | | |
| | | | subs | Rc,Rb,Ra | | | Ra − Rb → Rc >>1 | | |
| | | | submsk | Rc,Rb,Ra | R:BP0 | | Ra, Rb, CFR.BP0 → Rc | | 32 |
| | | Half word | fsubvh | Rc,Rb,Ra | | | | | |

Fig. 22B

| Category | SIMD Size | Instruction | Operand | CFR | PSR | Typical behavior | Operation unit |
|---|---|---|---|---|---|---|---|
| ALU sub system | Half word | vsubh | Rc,Rb,Ra | | | | A |
| | | vsubhvh | Rc,Rb,Ra | W:ovs | | | |
| | | vsrsubh | Rb,Ra,i08s | | | | |
| | | vsubsh | Rc,Rb,Ra | | | | |
| | | vxsubh | Rc,Rb,Ra | | | | |
| | | vxsubhvh | Rc,Rb,Ra | W:ovs | | | |
| | | vhsubh | Rc,Rb,Ra | | | | |
| | | vhsubhvh | Rc,Rb,Ra | W:ovs | | | |
| | | vlsubh | Rc,Rb,Ra | | | | |
| | | vlsubhvh | Rc,Rb,Ra | W:ovs | | | |
| | Byte | vsubb | Rc,Rb,Ra | | | | |
| | | vsrsubb | Rb,Ra,i08s | | | | |
| | | vasubb | Rc,Rb,Ra | R:VC | | | |

Fig. 23A

| Category | SIMD | Size | Instruction | Operand | CFR | PSR | Typical behavior | Operation unit | 31 16 |
|---|---|---|---|---|---|---|---|---|---|
| ALU logic system | SINGLE | Word | and | Rc,Ra,Rb | | | AND | | 32 |
| | | | | Rb,Ra,i08u | | | | | 16 |
| | | | | Ra2,Rb2 | | | | | 32 |
| | | | andn | Rc,Ra,Rb | | | | | 16 |
| | | | | Rb,Ra,i08u | | | | | 32 |
| | | | | Ra2,Rb2 | | | | | 16 |
| | | | or | Rc,Ra,Rb | | | OR | | 32 |
| | | | | Rb,Ra,i08u | | | | | 16 |
| | | | | Ra2,Rb2 | | | | | |
| | | | xor | Rc,Ra,Rb | | | Exclusive OR | A | 32 |
| | | | | Rb,Ra,i08u | | | | | |
| | | | | Ra2,Rb2 | | | | | |
| ALU mov system | SINGLE | Word | mov | Rb,Reg32 | | | Reg32 = TAR LR SVR PSR CFR MH0 MH1 ML0 ML1 EPSR IPC IPSR PC EPC PSR0 PSR1 PSR2 PSR3 CFR0 CFR1 CFR2 CFR3 | | 16 |
| | | | | Reg32,Rb | | | | | 32 |
| | | | | Rb2,Reg16 | | | Reg16 = TAR LR MH0 MH1 | | 16 |
| | | | | Reg16,Rb2 | | | | | 32 |
| | | | | Ra2,Rb | | | | A | |
| | | | | Ra,i16s | | | | | |
| | | | | Ra2,i08s | | | | | |
| | | | movp | Rc:Rc+1,Ra,Rb | | | Rc<-Ra; Rc+1<-Rb; | | 32 |
| | | | movcf | Ck,Cj;Cm,Cn | | | Ci<-Cj; Cm<-Cn; | | 16 |
| | | | mvclovs | Cm:Cm+1 | W:ovs | | Cm:Cm+1<-CFR.OVS;˜CFR.OVS; CFR.OVS<-0; | | 32 |
| | | | mvclcas | Cm:Cm+1 | W:cas | | Cm:Cm+1<-CFR.CAS;˜CFR.CAS; CFR.CAS<-0; | | 16 |
| | | | sethi | Ra,i16s | | | | | 32 |

Fig. 23B

| Category | SIMD | Size | Instruction | Operand | CFR | PSR | Typical behavior | Operation unit | 31 16 |
|---|---|---|---|---|---|---|---|---|---|
| ALU max min system | SINGLE | Word | max | Rc,Ra,Rb | W:c0:c1 | | Rc <- max(Ra,Rb) | | |
| | | | min | Rc,Ra,Rb | W:c0:c1 | | Rc <- min(Ra,Rb) | | |
| | SIMD | Half word | vmaxh | Rc,Ra,Rb | | | | A | 32 |
| | | | vminh | Rc,Ra,Rb | | | | | |
| | | Byte | vmaxb | Rc,Ra,Rb | | | | | |
| | | | vminb | Rc,Ra,Rb | | | | | |
| ALU abs system | SINGLE | | abs | Rb,Ra | | | Absolute value With overflow | A | 32 |
| | | | absvw | Rb,Ra | W:ovs | | | | |
| | | | fabsvh | Rb,Ra | W:ovs | | | | |
| | SIMD | Half word | vabshvh | Rb,Ra | W:ovs | | | | |
| ALU neg system | SINGLE | Word | negvw | Rb,Ra | W:ovs | | | A | 32 |
| | | Half word | fnegvh | Rb,Ra | W:ovs | | | | |
| | SIMD | | vneghvh | Rb,Ra | W:ovs | | | | |
| ALU sum system | | Half word | vsumh | Rb,Ra | | | Ra →Rb (Rounding) | A | 32 |
| | | | vsumh2 | Rb,Ra | | | | | |
| | | | vsumrh2 | Rb,Ra | | | | C | |
| | | Byte | vabssumb | Rc,Ra,Rb | | | | C | |
| | | | fmdvh | Rb,Ra | W:ovs | | Rounding | A | 32 |
| | | | vfrndvh | Rb,Mn | W:ovs | | | C | |
| ALU other | SINGLE | | vsel | Rc,Ra,Rb | R:VC | | | | |
| | | | vsgnh | Rb,Ra | | | | | |

Fig. 24A

| Category | SIMD | Size | Instruction | Operand | CFR | PSR | Typical behavior | Operation unit | 31 16 |
|---|---|---|---|---|---|---|---|---|---|
| CMP | S I N G L E | | cmpCCn | Cm,Ra,Rb,Cn<br>Cm,Ra,i05s,Cn<br>Cm:Cm+1,Ra,Rb,Cn<br>Cm:Cm+1,Ra,i05s,Cn | W:CF | | CC = eq, ne, gt, ge, gtu, geu, le, lt, leu, leu<br>Cm <-- result & Cn;<br>(Cm+1 <-- ~result & Cn;) | A | 32 |
| | | | cmpCCa | Cm:Cm+1,Ra,Rb,Cn<br>Cm:Cm+1,Ra,i05s,Cn | W:CF | | Cm <-- result & Cn;<br>Cm+1 <-- ~(result & Cn); | | 16 |
| | | | cmpCCo | Cm:Cm+1,Ra,Rb,Cn<br>Cm:Cm+1,Ra,i05s,Cn | W:CF | | Cm <-- result \| Cn;<br>Cm+1 <-- ~(result \| Cn); | | |
| | | | cmpCC | C6,Ra2,Rb2<br>C6,Ra2,i04s | W:CF | | CC = eq, ne, gt, ge, le, lt<br>C6 <-- result | | 32 |
| | | | tstzn | Cm,Ra,Rb,Cn<br>Cm,Ra,i05u,Cn<br>Cm:Cm+1,Ra,Rb,Cn<br>Cm:Cm+1,Ra,i05u,Cn | W:CF | | Cm <-- (Ra & Rb == 0) & Cn;<br>(Cm+1 <-- ~(Ra & Rb ==0) & Cn;) | | |
| | | | tstza | Cm:Cm+1,Ra,Rb,Cn<br>Cm:Cm+1,Ra,i05u,Cn | W:CF | | Cm <-- (Ra & Rb == 0) & Cn;<br>Cm+1 <-- ~((Ra & Rb == 0) & Cn); | | |
| | | | tstzo | Cm:Cm+1,Ra,Rb,Cn<br>Cm:Cm+1,Ra,i05u,Cn | W:CF | | Cm <-- (Ra & Rb == 0) \| Cn;<br>Cm+1 <-- ~((Ra & Rb == 0) \| Cn); | | |
| | | | tstnn | Cm,Ra,Rb,Cn<br>Cm,Ra,i05u,Cn<br>Cm:Cm+1,Ra,Rb,Cn<br>Cm:Cm+1,Ra,i05u,Cn | W:CF | | Cm <-- (Ra & Rb != 0) & Cn;<br>(Cm+1 <-- ~(Ra & Rb != 0) & Cn;) | | |
| | | | tstna | Cm:Cm+1,Ra,Rb,Cn<br>Cm:Cm+1,Ra,i05u,Cn | W:CF | | Cm <-- (Ra & Rb != 0) & Cn;<br>Cm+1 <-- ~((Ra & Rb != 0) & Cn); | | |
| | | | tstno | Cm:Cm+1,Ra,Rb,Cn<br>Cm:Cm+1,Ra,i05u,Cn | W:CF | | Cm <-- (Ra & Rb != 0) \| Cn;<br>Cm+1 <-- ~((Ra & Rb != 0) \| Cn); | | |
| | | | tstz | C6,Ra2,Rb2<br>C6,Ra2,i04u | W:CF | | C6 <-- (Ra2&Rb2 == 0 ) | | 16 |
| | | | tstn | C6,Ra2,Rb2<br>C6,Ra2,i04u | W:CF | | C6 <-- (Ra2&Rb2 != 0 ) | | |

Fig. 24B

| Category | SIMD Size | | Instruction | Operand | CFR | PSR | Typical behavior | Operation unit | 31 16 |
|---|---|---|---|---|---|---|---|---|---|
| CMP | S I M D | Half word | vcmpCCh<br>vscmpCCh | Ra,Rb<br>Ra,i05s | W:CF | | CC = eq, ne, gt, le, ge, lt | A | 32 |
| | | Byte | vcmpCCb<br>vscmpCCb | Ra,Rb<br>Ra,i05s | W:CF | | CC = eq, ne, gt, le ge, lt | | |

Fig. 25A

| Category | SIMD | Size | Instruction | Operand | CFR | PSR | Typical behavior | Operation unit |
|---|---|---|---|---|---|---|---|---|
| mul system | SINGLE | Word × Word | mul | Mm,Rc,Ra,Rb / Mm,Rb,Ra,i08s | | | Ra × Rb → (Immediate value) / Unsigned multiplication | X2 |
| | | | mulu | Mm,Rc,Ra,Rb / Mm,Rb,Ra,i08s | | | | |
| | | | fmulww | Mm,Rc,Ra,Rb | | fxp | Fixed point operation | |
| | | Word × Half word | hmul | Mm,Rc,Ra,Rb | | | Ra × Rb → MHm MLm → Rc | X1 |
| | | | lmul | Mm,Rc,Ra,Rb | | fxp | | |
| | | Half word × Half word | fmulhww | Mm,Rc,Ra,Rb | | fxp | | |
| | | | fmulhw | Mm,Rc,Ra,Rb | | fxp | | |
| | | | fmulhh | Mm,Rc,Ra,Rb | | fxp | | |
| | | | fmulhhr | Mm,Rc,Ra,Rb | | fxp | With rounding | |
| | SIMD | Half word × Half word | vmul | Mm,Rc,Ra,Rb | | fxp | | X2 |
| | | | vfmulw | Mm,Rc,Ra,Rb | | fxp | | |
| | | | vfmulh | Mm,Rc,Ra,Rb | | fxp | | |
| | | | vfmulhr | Mm,Rc,Ra,Rb | | fxp | With rounding | |

Fig. 25B

| Category | SIMD Size | Instruction | Operand | CFR | PSR | Typical behavior | Operation unit | 31 16 |
|---|---|---|---|---|---|---|---|---|
| mul system | SIMD HALF | vxmul | Mm,Rc,Ra,Rb | | | | X2 | 32 |
| | | vxfmulw | Mm,Rc,Ra,Rb | | fxp | | | |
| | | vxfmulh | Mm,Rc,Ra,Rb | | fxp | | | |
| | | vxfmulhr | Mm,Rc,Ra,Rb | | fxp | With rounding | | |
| | WORD | vhmul | Mm,Rc,Ra,Rb | | | | | |
| | | vhfmulw | Mm,Rc,Ra,Rb | | fxp | | | |
| | | vhfmulh | Mm,Rc,Ra,Rb | | fxp | | | |
| | | vhfmulhr | Mm,Rc,Ra,Rb | | fxp | With rounding | | |
| | HALF | vlmul | Mm,Rc,Ra,Rb | | | | | |
| | | vlfmulw | Mm,Rc,Ra,Rb | | fxp | | | |
| | | vlfmulh | Mm,Rc,Ra,Rb | | fxp | | | |
| | | vlfmulhr | Mm,Rc,Ra,Rb | | fxp | With rounding | | |
| | Word x Half word | vpfmulhww | Mm,Rc:Rc+1,Ra,Rb | | fxp | | | |
| | | vpfmulh | Mm,Rc:Rc+1,Ra,Rb | | fxp | | | |

Fig. 26A

| Category | SIMD Size | | Instruction | Operand | CFR | PSR | Typical behavior | Operation unit 31 16 |
|---|---|---|---|---|---|---|---|---|
| mac system | S I N G L E | Word × Word | mac | Mm,Rc,Ra,Rb,Mn M0,Rc,Ra,Rb,Rx | | | Sum of products operation using mul | X2 |
| | | | fmacww | Mm,Rc,Ra,Rb,Mn M0,Rc,Ra,Rb,Rx | | fxp | Sum of products operation using fmulww | |
| | | Word × Half word | hmac | Mm,Rc,Ra,Rb,Mn M0,Rc,Ra,Rb,Rx | | | Sum of products operation using hmul | 32 |
| | | | lmac | Mm,Rc,Ra,Rb,Mn M0,Rc,Ra,Rb,Rx | | | Sum of products operation using lmul | X1 |
| | | | fmachww | Mm,Rc,Ra,Rb,Mn M0,Rc,Ra,Rb,Rx | | fxp | Sum of products operation using fmulhww | |
| | | Half word × Half word | fmachw | Mm,Rc,Ra,Rb,Mn M0,Rc,Ra,Rb,Rx | | fxp | Sum of products operation using fmulhw | |
| | | | fmachh | Mm,Rc,Ra,Rb,Mn M0,Rc,Ra,Rb,Rx | | fxp | Sum of products operation using fmulhh | |
| | | | fmachhr | Mm,Rc,Ra,Rb,Mn M0,Rc,Ra,Rb,Rx | | fxp | With rounding | |
| | S I M D | Half word | vmac | Mm,Rc,Ra,Rb,Mn M0,Rc,Ra,Rb,Rx | | | Sum of products operation using vmul | X2 |
| | | × Half word | vfmacw | Mm,Rc,Ra,Rb,Mn M0,Rc,Ra,Rb,Rx | | fxp | Sum of products operation using vfmulw | |
| | | | vxmac | Mm,Rc,Ra,Rb,Mn M0,Rc,Ra,Rb,Rx | | | Sum of products operation using vxmul | |

Fig. 26B

| Category | SIMD Size | Instruction | Operand | CFR | PSR | Typical behavior | Operation unit 31 16 |
|---|---|---|---|---|---|---|---|
| mac system | S I M D | H A L F | vxfmacw | Mm,Rc,Ra,Rb,Mn | | fxp | Sum of products operation using vxfmulw | |
| | | | vxfmach | Mm,Rc,Ra,Rb,Mn<br>M0,Rc,Ra,Rb,Rx | | fxp | Sum of products operation using vxfmulh | |
| | | | vxfmachr | Mm,Rc,Ra,Rb,Mn<br>M0,Rc,Ra,Rb,Rx | | fxp | With rounding | |
| | | W O R D | vhmac | Mm,Rc,Ra,Rb,Mn<br>M0,Rc,Ra,Rb,Rx | | | Sum of products operation using vhmul | |
| | | | vhfmacw | Mm,Rc,Ra,Rb,Mn | | fxp | Sum of products operation using vhfmulw | 32 |
| | | | vhfmach | Mm,Rc,Ra,Rb,Mn<br>M0,Rc,Ra,Rb,Rx | | fxp | Sum of products operation using vhfmulh | X2 |
| | | X | vhfmachr | Mm,Rc,Ra,Rb,Mn<br>M0,Rc,Ra,Rb,Rx | | | With rounding | |
| | | H A L F | vlmac | Mm,Rc,Ra,Rb,Mn<br>M0,Rc,Ra,Rb,Rx | | | Sum of products operation using vlmul | |
| | | | vlfmacw | Mm,Rc,Ra,Rb,Mn | | fxp | Sum of products operation using vlfmulw | |
| | | W O R D | vfmach | Mm,Rc,Ra,Rb,Mn<br>M0,Rc,Ra,Rb,Rx | | fxp | Sum of products operation using vfmulh | |
| | | | vfmachr | Mm,Rc,Ra,Rb,Mn<br>M0,Rc,Ra,Rb,Rx | | fxp | With rounding | |
| | | | vlfmach | Mm,Rc,Ra,Rb,Mn<br>M0,Rc,Ra,Rb,Rx | | fxp | Sum of products operation using vlfmulh | |
| | | | vlfmachr | Mm,Rc,Ra,Rb,Mn<br>M0,Rc,Ra,Rb,Rx | | fxp | With rounding | |
| | Word x<br>Half word | vpfmachww | Mm,Rc:Rc+1,Ra,Rb,Mn | | fxp | | |

Fig. 27A

| Category | SIMD Size | | Instruction | Operand | CFR | PSR | Typical behavior | Operation unit 31 16 |
|---|---|---|---|---|---|---|---|---|
| msu system | Word × Word | | msu | Mm,Rc,Ra,Rb,Mn M0,Rc,Ra,Rb,Rx | | | Difference of products operation using mul | X2 |
| | | | fmsuww | Mm,Rc,Ra,Rb,Mn M0,Rc,Ra,Rb,Rx | | fxp | Difference of products operation using fmulww | |
| | Word × Half word | | hmsu | Mm,Rc,Ra,Rb,Mn M0,Rc,Ra,Rb,Rx | | | Difference of products operation using hmul | 32 |
| | | | lmsu | Mm,Rc,Ra,Rb,Mn M0,Rc,Ra,Rb,Rx | | | Difference of products operation using lmul | X1 |
| | | | fmsuhww | Mm,Rc,Ra,Rb,Mn M0,Rc,Ra,Rb,Rx | | fxp | Difference of products operation using fmulhww | |
| | Half word × Half word | | fmsuhw | Mm,Rc,Ra,Rb,Mn M0,Rc,Ra,Rb,Rx | | fxp | Difference of products operation using fmulhw | |
| | | | fmsuhh | Mm,Rc,Ra,Rb,Mn M0,Rc,Ra,Rb,Rx | | fxp | Difference of products operation using fmulhh | |
| | | | fmsuhhr | Mm,Rc,Ra,Rb,Mn M0,Rc,Ra,Rb,Rx | | fxp | With rounding | |

Fig. 27B

| Category | SIMD | Size | Instruction | Operand | CFR | PSR | Typical behavior | Operation unit 31 16 |
|---|---|---|---|---|---|---|---|---|
| msu system | SINGLE | HALF | vmsu | Mm,Rc,Ra,Rb,Mn M0,Rc,Ra,Rb,Rx | | | Difference of products operation using vmul | 32 |
| | | | vfmsuw | Mm,Rc,Ra,Rb,Mn M0,Rc,Ra,Rb,Rx | | fxp | Difference of products operation using vfmul | |
| | | | vfmsuh | Mm,Rc,Ra,Rb,Mn M0,Rc,Ra,Rb,Rx | | fxp | Difference of products operation using vfmulh | |
| | | | vxmsu | Mm,Rc,Ra,Rb,Mn M0,Rc,Ra,Rb,Rx | | | Difference of products operation using vxmul | |
| | | | vxfmsuw | Mm,Rc,Ra,Rb,Mn | | fxp | Difference of products operation using vxfmulw | |
| | | | vxfmsuh | Mm,Rc,Ra,Rb,Mn M0,Rc,Ra,Rb,Rx | | fxp | Difference of products operation using vxfmulh | |
| | | | vhmsu | Mm,Rc,Ra,Rb,Mn M0,Rc,Ra,Rb,Rx | | | Difference of products operation using vhmul | x2 |
| | | | vhfmsuw | Mm,Rc,Ra,Rb,Mn | | fxp | Difference of products operation using vhfmulw | |
| | | HALF | vhfmsuh | Mm,Rc,Ra,Rb,Mn | | fxp | Difference of products operation using vhfmulh | |
| | | WORD | vlmsu | Mm,Rc,Ra,Rb,Mn M0,Rc,Ra,Rb,Rx | | | Difference of products operation using vlmul | |
| | | | vlfmsuw | Mm,Rc,Ra,Rb,Mn | | fxp | Difference of products operation using vlfmulw | |
| | | | vlfmsuh | Mm,Rc,Ra,Rb,Mn M0,Rc,Ra,Rb,Rx | | fxp | Difference of products operation using vlfmulh | |

Fig. 28A

| Category | SIMD Size | | Instruction | Operand | CFR | PSR | Typical behavior | Operation unit |
|---|---|---|---|---|---|---|---|---|
| MEM ld system | S I N G L E | Word | ld | Rb,(Ra,d10u)<br>Rb,(GP,d13u)<br>Rb,(SP,d13u)<br>Rb,(Ra+)i10s<br>Rb2,(Ra2)<br>Rb2,(Ra2,d05u)<br>Rb2,(GP,d06u)<br>Rb2,(SP,d06u)<br>Rb2,(Ra2+) | | | Register 32 ⇐ Memory 32 | M |
| | | Half word | ldh | Rb,(Ra,d09u)<br>Rb,(GP,d12u)<br>Rb,(SP,d12u)<br>Rb,(Ra+)i09s<br>Rb2,(Ra2)<br>Rb3,(Ra3,d04u)<br>Rb2,(GP,d05u)<br>Rb2,(SP,d05u)<br>Rb2,(Ra2+) | | | 32 ⇐ 16 | |
| | | | ldhu | Rb,(Ra,d09u)<br>Rb,(GP,d12u)<br>Rb,(SP,d12u)<br>Rb,(Ra+)i09s | | | | |
| | | Byte | ldb | Rb,(Ra,d08u)<br>Rb,(GP,d11u)<br>Rb,(SP,d11u)<br>Rb,(Ra+)i08s | | | Register 32 ⇐ Memory 8 | |
| | | | ldbu | Rb,(Ra,d08u)<br>Rb,(GP,d11u)<br>Rb,(SP,d11u)<br>Rb,(Ra+)i08s | | | | |

Fig. 28B

| Category | SIMD | Size | Instruction | Operand | CFR | PSR | Typical behavior | Operation unit | 31 16 |
|---|---|---|---|---|---|---|---|---|---|
| MEM ld system | SINGLE | PAIR | Byte→ Half word | ld | Rb,(Ra,d10u) | | | | 32 |
| | | | ldbh | Rb,(Ra+)i07s | | | | | |
| | | | ldbuh | Rb,(Ra+)i07s | | | 16 → 8 8 | | |
| | | Word | ldp | Rb:Rb+1,(Ra,d11u) LR:SVR,(Ra,d11u) TAR:UDR,(Ra,d11u) Rb:Rb+1,(GP,d14u) LR:SVR,(GP,d14u) TAR:UDR,(GP,d14u) Rb:Rb+1,(SP,d14u) LR:SVR,(SP,d14u) TAR:UDR,(SP,d14u) Rb:Rb+1,(Ra+)i11s Rb:Rb+1,(SP,d07u) LR:SVR,(SP,d07u) Rb2:Re2,(Ra2+) | | | 32 32 → 32 32 | M | 32 |
| | | Half word | ldhp | Rb:Rb+1,(Ra,d10u) Rb:Rb+1,(Ra+)i10s Rb2:Re2,(Ra2+) | | | 32 32 → 16 16 | | 16 |
| | | Byte | ldbp | Rb:Rb+1,(Ra,d09u) Rb:Rb+1,(Ra+)i09s | | | 32 32 → 8 8 8 8 | | 32 |
| | | Byte→ Half word | ldbhp ldbuhp | Rb:Rb+1,(Ra+)i07s Rb:Rb+1,(Ra+)i07s | | | 16 16 → 8 8 8 8 | | 16 32 |

Fig. 29A

| Category | SIMD | Size | Instruction | Operand | CFR | PSR | Typical behavior | | Operation unit | 31 16 |
|---|---|---|---|---|---|---|---|---|---|---|
| | | | | | | | Register | Memory | | |
| MEM store system | SINGLE | Word | st | (Ra,d10u),Rb<br>(GP,d13u),Rb<br>(SP,d13u),Rb<br>(Ra+)i10s,Rb<br>(Ra2),Rb2<br>(Ra2,d05u),Rb2<br>(GP,d06u),Rb2<br>(SP,d06u),Rb2<br>(Ra2+),Rb2 | | | 32 → | 32 | M | 32 |
| | | Half word | sth | (Ra,d09u),Rb<br>(GP,d12u),Rb<br>(SP,d12u),Rb<br>(Ra+)i09s,Rb<br>(Ra2),Rb2<br>(Ra2,d04u),Rb2<br>(GP,d05u),Rb2<br>(SP,d05u),Rb2<br>(Ra2+),Rb2 | | | 16 → | 16 | | 16<br>32 |
| | | Byte | stb | (Ra,d08u),Rb<br>(GP,d11u),Rb<br>(SP,d11u),Rb<br>(Ra+)i08s,Rb | | | 8 → | 8 | | 16<br>32 |

Fig. 29B

| Category | SIMD | Size | Instruction | Operand | CFR | PSR | Typical behavior | Operation unit |
|---|---|---|---|---|---|---|---|---|
| MEM store system | SINGLE | Byte-> Half word | stbh | (Ra+)i07s,Rb | | | 8 → 16 | 31 16 |
| | | Word | stp | (Ra,d11u),Rb:Rb+1 | | | 32 → 32 | 32 |
| | | | | (Ra,d11u),LR:SVR | | | 32 32 | |
| | | | | (Ra,d11u),TAR:UDR | | | | |
| | | | | (GP,d14u),Rb:Rb+1 | | | | |
| | | | | (GP,d14u),LR:SVR | | | | |
| | | | | (GP,d14u),TAR:UDR | | | | |
| | | | | (SP,d14u),Rb:Rb+1 | | | | |
| | | | | (SP,d14u),LR:SVR | | | | |
| | | | | (SP,d14u),TAR:UDR | | | | |
| | | | | (Ra+)i11s,Rb:Rb+1 | | | | |
| | | | | (SP,d07u),Rb:Re | | | | |
| | | | | (SP,d07u),LR:SVR | | | | |
| | | | | (Ra2+),Rb2:Re2 | | | | M |
| | PAIR | Half word | sthp | (Ra,d10u),Rb:Rb+1 | | | 16 → 32 | 32 |
| | | | | (Ra+)i10s,Rb:Rb+1 | | | 16 | 16 |
| | | | | (Ra2+),Rb2:Re2 | | | | |
| | | Byte | stbp | (Ra,d09u),Rb:Rb+1 | | | 8 8 → 16 | 32 |
| | | | | (Ra+)i09s,Rb:Rb+1 | | | 8 8 | 16 |
| | | Byte-> Half word | stbhp | (Ra+)i07s,Rb:Rb+1 | | | 8 8 → 32 | 32 |
| | | | | | | | 8 8 | |

Fig. 30

| Category | SIMD | Size | Instruction | Operand | CFR | PSR | Typical behavior | Operation unit | 31 16 |
|---|---|---|---|---|---|---|---|---|---|
| BRA | | | setlr | d09s | | | Set LR | | |
| | | | | C5,d09s | | | Store instruction fetched from LR in branch buffer | | 32 |
| | | | settar | d09s | W:c6 | | Set TAR | | |
| | | | | C6,d09s | W:c2:c4,c6 | | Store instruction fetched from TAR in branch buffer | | |
| | | | | C6,C2:C4,d09s | W:c6,cm | | | | 16 |
| | | | | C6,Cm,d09s | W:c6 | | | | |
| | | | | C6,C4,d09s | | | | | 32 |
| | | | setbb | LR | | | Store instruction fetched from LR in branch buffer | | |
| | | | | TAR | | | Store instruction fetched from TAR in branch buffer | | |
| | | | jloop | C5,LR,Ra,i08s | W:c5 | | Only predicate [c5] | B | |
| | | | | C6,TAR,Ra,i08s | W:c6 | | Only predicate [c6] | | |
| | | | | C6,C2:C4,TAR,Ra,i08s | W:c2:c4,c6 | | | | 16 |
| | | | | C6,Cm,TAR,Ra,i08s | W:c6,cm | | | | |
| | | | | C6,TAR,Ra2 | W:c6 | | | | |
| | | | | C6,C2:C4,TAR,Ra2 | W:c2:c4,c6 | | | | |
| | | | | C6,Cm,TAR,Ra2 | W:c6 | | | | |
| | | | jmp | TAR | | | | | |
| | | | | LR | | | | | |
| | | | jmpl | TAR | R:CF | | | | |
| | | | | LR | | | | | |
| | | | jmpf | TAR | | | | | |
| | | | | LR | | | | | |
| | | | | Cm,TAR | | | | | |
| | | | | C6,C2:C4,TAR | | | | | |
| | | | jmpr | LR | | | | | |
| | | | br | d20s | | | | | 32 |
| | | | | d09s | | | Only predicates [c6][c7] | | 16 |
| | | | brl | d20s | R:CF | | | | 32 |
| | | | | d09s | | | | | 16 |
| | | | rti | | | W:PSR R:eh | | | |

Fig. 31A

| Category | SIMD | Size | Instruction | Operand | CFR | PSR | Typical behavior | Operation unit |
|---|---|---|---|---|---|---|---|---|
| BS asl system | SINGLE | Word | asl | Rc,Ra,Rb<br>Rb,Ra,i05u<br>Ra2,i04u | | | Left shift<br><<Rb[0:4]  Ra → Rc | S1 31 16 |
| | | | faslvw | Rc,Ra,Rb<br>Rb,Ra,i05u<br>Rc,Ra,Rb<br>Rb,Ra,i05u | W:ovs | | With saturation<br><<Rb[0:4]  Ra → Rc | S1 32 16 |
| | | Pair word | aslp | Mm,Ra,Mn,Rb<br>Mm,Rb,Mn,i06u<br>Mm,Rc,MHn,Ra,Rb<br>Mm,Rb,MHn,Ra,i06u | | | <<Ra[0:4]  MHm MLm → MHm MLm → Rb | S2 |
| | | | faslpvw | Mm,Ra,Mn,Rb<br>Mm,Rb,Mn,i06u | W:ovs | | With saturation<br><<Rb[0:4]  MHm MLm → MHm MLm → Rb | S2 |
| | SIMD | Word | vasl | Mm,Ra,Mn,Rb<br>Mm,Rb,Mn,i05u | | | MHm MLm<br>(1) (2) (1) (2) → Rb<br>(1)<<Ra[0:4]  (2)<<Ra[0:4] | S2 32 |
| | | | vfaslvw | Mm,Ra,Mn,Rb<br>Mm,Rb,Mn,i05u | W:ovs | | MHm MLm<br>(1) (2) (1) (2) → Rb<br>(1)<<Ra[0:4]  (2)<<Ra[0:4]<br>With saturation | S2 |
| | | Half word | vaslh | Rc,Ra,Rb<br>Rb,Ra,i04u | | | <<Rb[0:3] <<Rb[0:3]<br>Ra (1) (2) → (1) (2) Rc | S1 |
| | | | vfaslvh | Rc,Ra,Rb<br>Rb,Ra,i04u | W:ovs | | <<Rb[0:3] <<Rb[0:3]<br>Ra (1) (2) → (1) (2) Rc<br>With saturation | S1 |
| | | Byte | vaslb | Rc,Ra,Rb<br>Rb,Ra,i03u | | | <<Rb[0:2] <<Rb[0:2]<br>Ra (1) (2) (3) (4) → (1) (2) (3) (4) Rc<br><<Rb[0:2] <<Rb[0:2] | |

Fig. 31B

| Category | SIMD | Size | Instruction | Operand | CFR | PSR | Typical behavior | Operation unit | 31 16 |
|---|---|---|---|---|---|---|---|---|---|
| BS asr system | SINGLE | Word | asr | Rc,Ra,Rb<br>Rb,Ra,i05u<br>Ra2,i04u | | | Arithmetic shift right<br>>>Rb[0:4]<br>Ra → Rc | S1 | 32 |
| | | Pair word | asrp | Mm,Ra,Mn,Rb<br>Mm,Rb,Mn,i06u<br>Mm,Rc,MHn,Ra,Rb<br>Mm,Rb,MHn,Ra,i06u | | | >>Ra[0:4]<br>MHm MLm → MHm MLm → Rb | S2 | 16 |
| | SIMD | Word | vasr | Mm,Ra,Mn,Rb<br>Mm,Rb,Mn,i05u | | | MHm MLm<br>(1) (2) →<br>(1)>>Ra[0:4] (2)>>Ra[0:4]<br>MHm MLm<br>(1) (2) | S2 | 32 |
| | | Half word | vasrh | Rc,Ra,Rb<br>Rb,Ra,i04u | | | >>Rb[0:31] >>Rb[0:2]<br>Ra (1) (2) →<br>(1) (2) Rc | S1 | 16 |
| | | Byte | vasrb | Rc,Ra,Rb<br>Rb,Ra,i03u | | | >>Rb[0:2] >>Rb[0:2]<br>Ra (1) (2) (3) (4) →<br>>>Rb[0:2] >>Rb[0:2]<br>(1) (2) (3) (4) Rc | | |

Fig. 32A

| Category | SIMD | Size | Instruction | Operand | CFR | PSR | Typical behavior | Operation unit |
|---|---|---|---|---|---|---|---|---|
| BS lsr system | SINGLE | Word | lsr | Rc,Ra,Rb<br>Rb,Ra,i05u | | | Logical shift right<br>>>>Rb[0:4]<br>Ra → Rc | S1 |
| | | Pair word | lsrp | Mm,Ra,Mn,Rb<br>Mm,Rb,Mn,i06u<br>Mm,Rc,MHn,Ra,i06u<br>Mm,Rb,MHn,Ra,i06u | | | >>>Ra[0:4]<br>MHm MLm → MHm MLm → Rb<br>MHm MLm<br>(1) (2) (1) (2)<br>(1)>>>Ra[0:4] (2)>>>Ra[0:4] → MHm MLm<br>(1) (2) → Rb | S2 |
| | SIMD | Word | vlsr | Mm,Ra,Mn,Rb<br>Mm,Rb,Mn,i05u | | | >>>Rb[0:3] >>>Rb[0:3]<br>Ra (1) (2) → Rc (1) (2) | S1 |
| | | Half word | vlsrh | Rc,Ra,Rb<br>Rb,Ra,i04u | | | | |
| | | Byte | vlsrb | Rc,Ra,Rb<br>Rb,Ra,i03u | | | >>>Rb[0:2] >>>Rb[0:2]<br>Ra (1) (2) (3) (4) → Rc (1) (2) (3) (4)<br>>>>Rb[0:2] >>>Rb[0:2] | S1 |

Fig. 32B

| Category | SIMD | Size | Instruction | Operand | CFR | PSR | Typical behavior | Operation unit | |
|---|---|---|---|---|---|---|---|---|---|
| BS rotate system | SINGLE | Word | rol | Rc,Ra,Rb<br>Rb,Ra,i05u | | | Ra <<Rb[4:0] → Rc | S1 | 31<br>16 |
| | SIMD | Half word | vrolh | Rc,Ra,Rb<br>Rb,Ra,i04u | | | | | 32 |
| | | Byte | vrolb | Rc,Ra,Rb<br>Rb,Ra,i03u | | | | | |
| BS ext system | SINGLE | Word | extw | Mm,Rb,Ra | | | Ra → MLm,Ra,Rc | C | 32 |
| | | Half word | exth | Ra2 | | | Ra2 (1) → s...(1) Ra2 | S2 | 16 |
| | | | exthu | Ra2 | | | Ra2 (1) → 0...(1) Ra2 | | |
| | | Byte | extb | Ra2 | | | Ra2 (1) → s...(1) Ra2 | | |
| | | | extbu | Ra2 | | | Ra2 (1) → 0...(1) Ra2 | | |
| | SIMD | Half word | vexth | Mm,Rb,Ra | | | Ra (1)(2) → MHm s...(1)(2) Rb | C | 32 |

Fig. 33

| Category | SIMD | Size | Instruction | Operand | CFR | PSR | Typical behavior | Operation unit 31 to |
|---|---|---|---|---|---|---|---|---|
| CNV valn system | SIMD | | valn | Rc,Ra,Rb | R:aln[1:0] | | <<(CFR.ALN[1:0]<<3) [63:32] Ra Rb → Rb Rc | 32 C |
| | | | valn1 | Rc,Ra,Rb | | | Ra (1) Rb (2) → (1) (2) Rc | |
| | | | valn2 | Rc,Ra,Rb | | | Ra (1) Rb (2) → (1) (2) Rc | |
| | | | valn3 | Rc,Ra,Rb | | | Ra (1) Rb (2) → (1) (2) Rc | |
| | | | valnvc1 | Rc,Ra,Rb | R:VC0 | | | |
| | | | valnvc2 | Rc,Ra,Rb | R:VC0 | | | |
| | | | valnvc3 | Rc,Ra,Rb | R:VC0 | | | |
| | | | valnvc4 | Rc,Ra,Rb | R:VC0 | | | |

Fig. 34A

| Category | SIMD Size | Instruction | Operand | CFR | PSR | Typical behavior | Operation unit 31 16 |
|---|---|---|---|---|---|---|---|
| CNV | SINGLE | bcnt1 | Rb,Ra | | | Count the number of 1s | 32 C |
| | | bseq0 | Rb,Ra | | | Count number of values from MSB until first 0 is reached | |
| | | bseq1 | Rb,Ra | | | Count number of values from MSB until first 1 is reached | |
| | | bseq | Rb,Ra | | | Count number of values from MSB −1 until first MSB is reached | |
| | | mskbrvh | Rc,Ra,Rb | R:BP0 | | | |
| | | byterev | Rb,Ra | | | | |
| | | mskbrvb | Rc,Ra,Rb | R:BP0 | | | |
| | SIMD Half word | vintllh | Rc,Ra,Rb | | | | |
| | | vintlhh | Rc,Ra,Rb | | | | |
| | Byte | vintllb | Rc,Ra,Rb | | | | |
| | | vintlhb | Rc,Ra,Rb | | | | |
| | Half word | vhunpkh | Rb:Rb+1,Ra | | | | |

Fig. 34B

| Category | SIMD Size | Instruction | Operand | CFR | PSR | Typical behavior | Operation unit |
|---|---|---|---|---|---|---|---|
| CNV | Byte | vhunpkb | Rb:Rb+1,Ra | | | | 31 16 / 32 |
| | Half word | vlunpkh | Rb:Rb+1,Ra | | | | |
| | | vlunpkhu | Rb:Rb+1,Ra | | | | C |
| | Byte | vlunpkb | Rb:Rb+1,Ra | | | | |
| | | vlunpkbu | Rb:Rb+1,Ra | | | | |
| | | vunpk1 | Rb,Mn | | | | |
| | | vunpk2 | Rb,Mn | | | | |
| | Half word | vstovh | Rb,Ra | | | | |
| | Byte | vstovb | Rb,Ra | | | | |
| | | vhpkb | Rc,Ra,Rb | | | | |

Fig. 35

| Category | SIMD Size | Instruction | Operand | CFR | PSR | Typical behavior | Operation unit 31 16 |
|---|---|---|---|---|---|---|---|
| SAT vlpk system | S I M D Word->Half word | vlpkh | Rc,Ra,Rb | | | With saturation | 32 C |
| | | vlpkhu | Rc,Ra,Rb | | | With unsigned saturation | |
| | S I M D Half word->Byte | vlpkb | Rc,Ra,Rb | | | With saturation | |
| | | vlpkbu | Rc,Ra,Rb | | | With unsigned saturation | |
| SAT sat system | S I N G L E Word | satw | Mm,Rb,Mn | | | Word saturation | 32 C |
| | | sath | Rb,Ra | | | Half wordsaturation | |
| | | satb | Rb,Ra | | | Bytesaturation | |
| | | satbu | Rb,Ra | | | Unsigned byte saturation | |
| | | sat9 | Rb,Ra | | | 9-bit saturation | |
| | | sat12 | Rb,Ra | | | 12-bit saturation | |
| | S I M D Half word | vsath | Mm,Rb,Mn | | | With saturation | |
| | | vsath8 | Rb,Ra | | | Signed 8-bit saturation | |
| | | vsath8u | Rb,Ra | | | Unigned 8-bit saturation | |
| | | vsath9 | Rb,Ra | | | 9-bit saturation | |
| | | vsath12 | Rb,Ra | | | 12-bit saturation | |

Fig. 36A

| Category | SIMD | Size | Instruction | Operand | CFR | PSR | Typical behavior | Operation unit | 31 16 |
|---|---|---|---|---|---|---|---|---|---|
| MSK | | | mskgen | Rc,Rb<br>Rb,I05U,i05u | | | Generate mask, Rb[12:8] Rb[4:0] or Rb | | |
| | | | msk | Rc,Ra,Rb<br>Rb,Ra,I05U,i05u | | | Ra or Rb | S2 | 32 |
| EXTR | | | extr<br>extru | Rc,Ra,Rb<br>Rb,Ra,I05U,i05u<br>Rc,Ra,Rb<br>Rb,Ra,I05U,i05u | | | With sign extension<br>(Without sign extension) | S2 | 32 |
| DIV | | | div<br>divu | MHm,Rc,MHn,Ra,Rb<br>MHm,Rc,MHn,Ra,Rb | W:ovs | | Division | DIV | 32 |

Fig. 36B

| Category | SIMD | Size | Instruction | Operand | CFR | PSR | Typical behavior | Operation unit | 31 16 |
|---|---|---|---|---|---|---|---|---|---|
| ETC | | | piNl | | | W:ih,ie,fie,pl R:PSR | Software interrupt N=0~7 | | 32 |
| | | | piN | | | W:ih,ie,pl R:PSR | Software interrupt N=0~7 | B | 16 |
| | | | scN | | | W:ih,ie,pl R:PSR | System call N=0~7 | | 32 |
| | | | ldstb | Rb,(Ra) | | | load bus lock | | |
| | | | rd | Rb,(Ra) Rb,(d11u) Rb2,(Ra2) | | R:eee | External register read | M | 32 16 |
| | | | wt | (Ra),Rb (d11u),Rb (Ra2),Rb2 | | R:eee | External register write | | 32 16 |
| | | | dpref | (Ra,d11u) | | | Pre-fetch | | |
| | | | dbgmN | i18u | | | N=0~3 | DBGM | |
| | | | vcchk | | W:CF R:VC | | VC flag check | | |
| | | | vmpsw | | | | VMP switching | | |
| | | | vmpsw | LR | | | VMP switching | B | 32 |
| | | | vmpintd1 | | | W:ie | VMP switching disabled | | |
| | | | vmpintd2 | | | | | | |
| | | | vmpintd3 | | | | | | |
| | | | vmpinte1 | | | W:ie | | | |
| | | | vmpinte2 | | | W:ie | VMP switching enabled | | |
| | | | vmpinte3 | | | | | | |
| | | | nop | | | | no operation | A | 16 |

Fig. 37 jloop C6,Cm,TAR,Ra

| Behavior | =>jloop C6,Cm,TAR,Ra,-1<br><br>PC <- TAR; C6 <- (Ra >= 0)? 1:0; Cm <- 1;<br><br>Ra <- Ra - sext(1);<br><br>Used as part of loop.<br><br>Following processing is performed:<br><br>(1) Set 1 to Cm.<br><br>(2) Add -1 to Ra, and store result in Ra. Set 0 to C6 when value held in Ra becomes smaller than 0.<br><br>(3) Branch to address stored in TAR. Fill branch destination instruction, if there is no branch destination instruction filled in branch destination buffer. |
|---|---|
| Assembler mnemonic | Format | Affecting flag | Affected flag |
| jloop C6,Cm,TAR,Ra | 32bit synonym | Cm,C6 | — |
| Remarks |||||
| ※Behavior when Cm=C6 is undefined. |||||

Fig. 38 settar C6,Cm,D9

| Behavior | TAR <- PC + (sext(D9[8:1]) <<1 );<br><br>C6 <- 1; Cm <- 0;<br><br><br>Following processing is performed:<br><br>(1) Store address resulted from adding PC value to displacement value (D9) into TAR.<br><br>(2) Fetch instruction corresponding to such address, and store it in branch destination buffer.<br><br>(3) Set C6 to 1, and Cm to 0. |||||
|---|---|---|---|---|
| Assembler mnemonic | Format | Affecting flag | Affected flag ||
| settar C6,Cm,D9 | 32bit | Cm,C6 | — ||
| Remarks |||||
| D9 is a signed value, and low 1 bit shall be 0.<br>Behavior when Cm=C6 is undefined. |||||

```
int func2(int a, int b, int c)
{
        int i;
        int t;

for (i = 0; i < 100; i++) {
                y[i] = x[i] + i;
                t += x[i];
        }
        return t;
}
```

Fig. 41

```
        mov     r4, 0
        ld      r6, (gp,_x$ - .MN.gptop)
        ;;
        mov     r1, 98
        settar  C6, C4, L00023   // Reset C4 at the same time
        ld      r5, (gp,_y$ - .MN.gptop)
        ;;
L00023                           //2cycle/iterartion
[C4]    add     r2, r3, r4
[C4]    add     r0, r3, r0
[C6]    ld      r3, (r6+)
        ;;
[C4]    add     r4, r4, 1
[C4]    st      (r5+), r2
[C6]    jloop   C6, C4, tar, r1, -1// Set C4 at the same time
        ;;
        ret
        ;;
```

Fig. 42 jloop C6,C2:C4,TAR,Ra

| Behavior | => jloop C6,C2:C4,TAR,Ra,-1<br><br>PC <- TAR;<br>C2 <- C3, C3 <- C4, C6 <- C4;<br>C4 <- (Ra >= 0)? 1 : 0;<br>Ra <- Ra - sext(1);<br><br>Used as part of loop. Following processing is performed:<br>(1) Move C3 to C2, and C4 to C3 and C6.<br>(2) Add -1 to Ra, and store result in Ra. Set 0 to C4 when value held in Ra becomes smaller than 0.<br>(3) Branch to address stored in TAR. Fill branch destination instruction, if there is no branch destination instruction filled in branch destination buffer. | | | |
|---|---|---|---|---|
| Assembler mnemonic | | Format | Affecting flag | Affected flag |
| jloop C6,C2:C4,TAR,Ra | | 32bit synonym | C2,C4,C6,C3 | — |
| Remarks | | | | |
| | | | | |

Fig. 43 settar C6,C2:C4,D9

| Behavior | TAR <- PC + (sext(D9[8:1]) <<1 );<br><br>C2 <- 0; C3 <- 0; C4 <- 1, C6 <- 1;<br><br><br>Following processing is performed:<br><br>(1) Store address resulted from adding PC value to displacement value (D9) into TAR.<br><br>(2) Fetch instruction corresponding to such address, and store it in branch destination buffer.<br><br>(3) Set C4 and C6 to 1, and C2 and C3 to 0. |
|---|---|
| Assembler mnemonic | Format | Affecting flag | Affected flag |
| settar C6,C2:C4,D9 | 32bit | C2,C4,C6,C3 | — |
| Remarks ||||
| D9 is a signed value, and low 1 bit shall be 0. ||||

Fig. 44

(a)
```
                            settar  C6,C4,L0
A                      L0:
B A                         [C4] A
C B A                       [C3] B
  C B A                     [C2] C
    C B A                   [C6] jloop
      C B
        C
```

(b)
```
Flag         C4 C3 C2 C6
Instruction  A  B  C  jloop 1  0  0  1      A
             1  1  0  1      B A
             1  1  1  1      C B A
             1  1  1  1        C B A
             0  1  1  1          C B A
             0  0  1  1              C
```

Fig. 45

```
int x[100], y[100];

int func(int a, int b, int c)
{
        int i;

for (i = 0; i < 100; i++) {
                y[i] = a * x[i] + b + i;
        }
        return t;
}
```

Fig. 46

```
         mov     r6, 0
         ld      r10, (gp, _x$ - .MN.gptop)
         ;;
         mov     r4, 98
         settar  C6, C4:C2, L00014
         ld      r9, (gp, _y$ - .MN.gptop)
         ;;
L00014                                   //2cycle/iterartion
[C2]     add     r5, r8, r6
[C3]     mac     m0, r8, r7, r0, r1
[C4]     ld      r7, (r10+)
         ;;
[C2]     add     r6, r6, 1
[C2]     st      (r9+), r5
[C6]     jloop   C6, tar, r4, -1    //L00014
         ;;
         ret
         ;;
```

Fig. 47 jloop C6,C1:C4,TAR,Ra

| Behavior | => jloop C6,C1:C4,TAR,Ra,-1<br><br>PC <- TAR;<br><br>C1 <- C2, C2 <- C3, C3 <- C4 C6 <- C4;<br><br>C4 <- (Ra >= 0)? 1 : 0;<br><br>Ra <- Ra - sext(1);<br><br>Used as part of loop. Following processing is performed:<br><br>(1) Move C2 to C1, C3 to C2, and C4 to C3 and C6.<br><br>(2) Add -1 to Ra, and store result in Ra. Set 0 to C4 when value held in Ra becomes smaller than 0.<br><br>(3) Branch to address stored in TAR. Fill branch destination instruction, if there is no branch destination instruction filled in branch destination buffer. |||| 
|---|---|---|---|---|
| Assembler mnemonic | Format | | Affecting flag | Affected flag |
| jloop C6,C1:C4,TAR,Ra | 32bit synonym | | C1,C2,C4,C6,C3 | — |
| Remarks |||||
| |||||

Fig. 48 settar C6,C1:C4,D9

| Behavior | TAR <- PC + (sext(D9[8:1]) <<1 );<br><br>C1 <- 0; C2 <- 0; C3 <- 0; C4 <- 1, C6 <- 1;<br><br>Following processing is performed:<br><br>(1) Store address resulted from adding PC value to displacement value (D9) into TAR.<br><br>(2) Fetch instruction corresponding to such address, and store it in branch destination buffer.<br><br>(3) Set C4 and C6 to 1, and C1, C2 and C3 to 0. |
|---|---|
| Assembler mnemonic | Format | Affecting flag | Affected flag |
| settar C6,C1:C4,D9 | 32bit | C1,C2,C4,C6,C3 | — |
| Remarks |||| 
| D9 is a signed value, and low 1 bit shall be 0. ||||

Fig. 49

```
int x[100], y[100];
int func(int a, int b, int c)
{
    int i;
    for (i=0; i <100; i++){
        y[i]=(a* x[i] + b + i)*i;
    }
    return t;
}
```

Fig. 50

```
            mov     r11, 0
            mov     r6, 0
            ld      r10,(gp,_x$-.MN.gptop)
            ;;
            mov     r4, 98
            settar  C6, C1:C4, L00014
            ld      r9,(gp,_y$-.MN.gptop)
            ;;
L00014
[C1]        mul     r12, r5, r11
[C2]        add     r5, r8, r6
[C3]        mac     m0, r8, r7, r0, r1
[C4]        ld      r7,(r10+)
;;
[C1]        add     r11, r11, 1
[C2]        add     r6, r6, 1
[C1]        st      (r9+), r12
[C6]        jloop   C6, C1:C4, tar, r4      //L00014
            ;;
            ret
            ;;
```

Fig. 51

| | For loop [C6] | Software pipelining [C4] [C3] [C2] [C1] | | | | |
|---|---|---|---|---|---|---|
| Cycle1 | A          | 1 | 1 | 0 | 0 | 0 | Prolog phase |
| Cycle2 | B A        | 1 | 1 | 1 | 0 | 0 |
| Cycle3 | C B A      | 1 | 1 | 1 | 1 | 0 |
| Cycle4 | D C B A    | 1 | 1 | 1 | 1 | 1 | Kernel phase |
| Cycle5 | D C B      | 1 | 0 | 1 | 1 | 1 | Epilog phase |
| Cycle6 | D C        | 1 | 0 | 0 | 1 | 1 |
| Cycle7 | D          | 0 | 0 | 0 | 0 | 1 |

Fig. 53

| | For loop [C6] | Software pipelining | | | | | | |
| | | [C5] | [C4] | [C3] | [C2] | [C1] | | |
|---|---|---|---|---|---|---|---|---|
| Cycle1 | X A | 1 | 1 | 1 | 0 | 0 | 0 | Prolog phase |
| Cycle2 | B A | 1 | 0 | 1 | 1 | 0 | 0 | |
| Cycle3 | C B A | 1 | 0 | 1 | 1 | 1 | 0 | |
| Cycle4 | D C B A | 1 | 0 | 1 | 1 | 1 | 1 | Kernel phase |
| Cycle5 | D C B | 1 | 0 | 0 | 1 | 1 | 1 | |
| Cycle6 | D C | 1 | 0 | 0 | 0 | 1 | 1 | Epilog phase |
| Cycle7 | Y D | 0 | 1 | 0 | 0 | 0 | 1 | |

Fig. 55

| | For loop [C6] | Software pipelining [C4] [C3] [C2] [C1] | | | | |
|---|---|---|---|---|---|---|
| Cycle1 | A | 1 | 1 | 0 | 0 | 0 | Prolog phase |
| Cycle2 | B A | 1 | 1 | 1 | 0 | 0 |
| Cycle3 | C B A | 1 | 1 | 1 | 1 | 0 |
| Cycle4 | D C B A | 1 | 1 | 1 | 1 | 1 | Kernel phase |
| Cycle5 | D C B | 1 | ⓪ | 1 | 1 | 1 |
| Cycle6 | D C | 1 | 0 | 0 | 1 | 1 | Epilog phase |
| Cycle7 | D | 0 | 0 | 0 | 0 | 1 |

Fig. 56

| | For loop | | Software pipelining | | | |
|---|---|---|---|---|---|---|
| | Loop counter | Epilog counter | Predicate register | | | |
| Cycle1 | A | 3 | 4 | 1 | 0 | 0 | 0 | Prolog phase |
| Cycle2 | B A | 2 | 4 | 1 | 1 | 0 | 0 | |
| Cycle3 | C B A | 1 | 4 | 1 | 1 | 1 | 0 | |
| Cycle4 | D C B A | 0 | 4 | 1 | 1 | 1 | 1 | Kernel phase |
| Cycle5 | D C B | 0 | 3 | 0 | 1 | 1 | 1 | Epilog phase |
| Cycle6 | D C | 0 | 2 | 0 | 0 | 1 | 1 | |
| Cycle7 | D | 0 | 1 | 0 | 0 | 0 | 1 | |

PROCESSOR AND COMPILER FOR DECODING AN INSTRUCTION AND EXECUTING THE DECODED INSTRUCTION WITH CONDITIONAL EXECUTION FLAGS

BACKGROUND OF THE INVENTION (1) Field of the Invention

The present invention relates to a processor such as a DSP (Digital Signal Processor) and a CPU (Central Processing Unit), as well as to a compiler that generates instructions executed by such a processor. More particularly, the present invention relates to a processor and a compiler which are suitable for performing signal processing for sounds, images and others.

(2) Description of the Related Art

With the development in multimedia technologies, processors are increasingly required to be capable of high-speed media processing represented by sound and image signal processing. As existing processors responding to such requirement, there exist Pentium®/Pentium® III/Pentium 4® MMX/SSE/SSE2 and others produced by the Intel Corporation of the United States supporting SIMD (Single Instruction Multiple Data) instructions. Of these processors, MMX Pentium, for example, is capable of performing the same operations in one instruction on a maximum of eight integers stored in a 64-bit-long MMX register.

Such existing processors realize high-speed processing by utilizing software pipelining, as described in the following: Mitsuru Ikei, *IA-64 Processor Basic Course* (*IA-64 Processor Kihon Koza*), Tokyo: Ohmsha Ltd., 1999. FIG. 4.32 p. 129.

FIG. 56 is a diagram showing the operation of an existing processor using 4-stage software pipelining. In order to implement software pipelining, predicate flags used for predicates that indicate whether or not instructions should be executed are stored in a predicate register. In addition to this, the number of execution times until processing of the prolog phase in the software pipelining ends is stored in the loop counter, whereas the number of execution times until processing of the epilog phase in the software pipelining ends is stored in the epilog counter.

However, the above-described existing processor manages the loop counter, the epilog counter and the predicate register as individual hardware resources. Therefore, such processor is required to be equipped with many resources, which results in large-scale circuits.

Moreover, a large-scale circuit means that the amount of power consumed by the processor becomes large.

SUMMARY OF THE INVENTION

The present invention has been conceived in view of the above circumstances, and it is an object of the present invention to provide a processor whose circuitry scale is small and which is capable of performing loop processing at a high speed while consuming a low amount of power.

In order to achieve the above object, the processor according to the present invention is a processor for decoding an instruction and executing said decoded instruction. The processor comprises: a flag register in which a plurality of conditional execution flags are stored, where the plurality of conditional execution flags are used as predicates for conditional execution instructions; a decoding unit operable to decode an instruction; and a execution unit operable to execute the instruction decoded by the decoding unit. When the instruction decoded by the decoding unit is a loop instruction, an iteration of a loop to be executed terminates in the execution unit, based on a value of one of the plurality of conditional execution flags for an epilog phase in the loop in a case where the loop is unrolled into the conditional execution instructions by means of software pipelining.

As described above, a judgment is made as to whether or not the loop iteration has terminated, based on a conditional execution flag in the epilog phase in the case where such loop is unrolled into conditional execution instructions by means of software pipelining. Accordingly, there is no need to use special hardware resources such as a counter in order to judge whether or not the loop processing has terminated, and it becomes possible to prevent the circuitry scale from becoming large. This contributes to a reduction in the power consumption of the processor.

Moreover, the flag register may further store a loop flag which is used to judge whether or not the iteration has terminated, and the execution unit may set, to the loop flag, the value of the one of the plurality of conditional execution flags for the epilog phase. For example, the execution unit sets, to the loop flag in one cycle later in the epilog phase, the value of the conditional execution flag for a conditional execution instruction to be executed in an (N−2)th pipeline stage (where N is an integer greater than or equal to 3), in a case where the number of stages in the software pipelining is N and the stages are counted up each time processing in the epilog phase finishes.

As described above, a judgment is made as to whether or not the loop has terminated by use of the value of a conditional execution flag that is specified according to which stage the software pipelining such conditional execution flag is in. Accordingly, there is no need to use special hardware resources such as a counter in order to judge whether or not the loop processing has terminated, and it becomes possible to prevent the circuitry scale from becoming large, regardless of how many stages are contained in software pipelining. This contributes to a reduction in the power consumption of the processor.

Also, the processor according to the above configuration may further comprise an instruction buffer for temporarily storing the instruction decoded by the decoding unit, and in such processor, the decoding unit may be configured not to read out one of the conditional execution instructions from the instruction buffer until the loop terminates, when judging that the conditional execution instruction should not be executed based on the value of the one of the plurality of conditional execution flags for the epilog phase.

As described above, once a conditional execution instruction stops being executed in the epilog phase, the conditional execution instruction will not be executed in the software pipelining until the loop processing ends. Accordingly, there is no need to read out the conditional execution instruction from the corresponding instruction buffer, which makes it possible for the processor to consume a small amount of power.

Meanwhile, the compiler according to another aspect of the present invention is a complier for translating a source program into a machine language program for a processor which is capable of executing instructions in parallel. The complier comprises: a parser unit for parsing the source program; an intermediate code conversion unit for converting the parsed source program into intermediate codes; an optimization unit for optimizing the intermediate codes; and a code generation unit for converting the optimized intermediate codes into machine language instructions. The processor stores a plurality of flags which are used as predicates for conditional execution instructions, and the optimization unit, when the intermediate codes include a loop, places an instruction in a prolog phase in loop in a case where said loop is unrolled by means of software pipelining so that the instruction is to be executed immediately before the loop.

As described above, an instruction to be executed immediately before a loop is placed in the prolog phase in the case where such loop is unrolled by means of software pipelining. Accordingly, it becomes possible to reduce the number of empty stages in the software pipelining, and therefore to execute a program at a high speed. Furthermore, it also becomes possible to reduce the amount of power consumption of a processor that executes a program compiled by this compiler.

Also, the compiler according to another aspect of the present invention is a complier for translating a source program into a machine language program for a processor which is capable of executing instructions in parallel. The compiler comprises: a parser unit for parsing the source program; an intermediate code conversion unit for converting the parsed source program into intermediate codes; an optimization unit for optimizing the intermediate codes; and a code generation unit for converting the optimized intermediate codes into machine language instructions. The processor stores a plurality of flags which are used as predicates for conditional execution instructions, and the optimization unit, when the intermediate codes include a conditional branch instruction, assigns the plurality of conditional execution flags so that a conditional execution flag which is used as a predicate for a conditional execution instruction in a case where a condition indicated by said conditional branch instruction is met, becomes different from a conditional execution flag used as a predicate for a conditional execution instruction in a case where the condition is not met.

As described above, even when an instruction to be executed when a predetermined condition is met and an instruction to be executed when the condition is not met are different as in the case of an if-else statement in the C language, for example, different flags to be used as predicates shall be associated with the respective instructions. Accordingly, it becomes possible to implement processing which is equivalent to a conditional branch instruction, simply by changing flag values. Since it is possible to realize a conditional branch instruction through such simple processing, it becomes possible to reduce the amount of power consumed by a processor that executes a program compiled by this compiler.

Note that not only is it possible to embody the present invention as a processor that executes the above characteristic instructions and a compiler that generates such characteristic instructions, but also as an operation processing method to be applied on plural data elements, and as a program that includes the characteristic instructions. In addition, it should also be noted that such program can be distributed via a recording medium such as CD-ROM (Compact Disc-Read Only Memory) and a transmission medium such as the Internet.

As further information about the technical background to this application, Japanese Patent application No. 2003-081132, filed on Mar. 24, 2003, is incorporated herein by reference.

BRIEF DESCRIPTION OF THE DRAWINGS

These and other objects, advantages and features of the invention will become apparent from the following description thereof when taken in conjunction with the accompanying drawings that illustrate a specific embodiment of the invention. In the Drawings:

FIG. 11 is a diagram showing a configuration of a program status register (PSR) of the processor;

FIG. 12 is a diagram showing a configuration of a conditional flag register (CFR) of the processor;

FIGS. 21A and 21B are diagrams explaining instructions belonging to a category "ALUadd (addition) system";

FIGS. 22A and 22B are diagrams explaining instructions belonging to a category "ALUsub (subtraction) system";

FIGS. 23A and 23B are diagrams explaining instructions belonging to a category "ALUlogic (logical operation) system and others";

FIGS. 24A and 24B are diagrams explaining instructions belonging to a category "CMP (comparison operation) system";

FIGS. 25A and 25B are diagrams explaining instructions belonging to a category "mul (multiplication) system";

FIGS. 26A and 26B are diagrams explaining instructions belonging to a category "mac (sum of products operation) system";

FIGS. 27A and 27B are diagrams explaining instructions belonging to a category "msu (difference of products) system";

FIGS. 28A and 28B are diagrams explaining instructions belonging to a category "MEMld (load from memory) system";

FIGS. 29A and 29B are diagrams explaining instructions belonging to a category "MEMstore (store in memory) system";

FIG. 30 is a diagram explaining instructions belonging to a category "BRA (branch) system";

FIGS. 31A and 31B are diagrams explaining instructions belonging to a category "BSasl (arithmetic barrel shift) system and others";

FIGS. 32A and 32B are diagrams explaining instructions belonging to a category "BSlsr (logical barrel shift) system and others";

FIG. 33A is a diagram explaining instructions belonging to a category "CNVvaln (arithmetic conversion) system";

FIGS. 34A and 34B are diagrams explaining instructions belonging to a category "CNV (general conversion) system";

FIG. 35 is a diagram explaining instructions belonging to a category "SATvlpk (saturation processing) system";

FIGS. 36A and 36B are diagrams explaining instructions belonging to a category "ETC (et cetera) system";

FIG. 37 is a diagram explaining a detailed behavior of the processor when executing Instruction "jloop C6, Cm, TAR, Ra";

FIG. 38 is a diagram explaining a detailed behavior of the processor when executing Instruction "settar C6, Cm, D9";

FIG. 41 is a diagram showing an example machine language program to be generated by using Instruction jloop and Instruction settar according to the present embodiment;

FIG. 42 is a diagram explaining a detailed behavior of the processor when executing Instruction "jloop C6, C2: C4, TAR, Ra";

FIG. 43 is a diagram explaining a detailed behavior of the processor when executing Instruction "settar, C6, C2: C4, D9";

FIG. 44 is a diagram showing prolog/epilog removal 3-stage software pipelining;

FIG. 45 is a diagram showing a source program written in the C language;

FIG. 46 is a diagram showing an example machine language program to be generated by using Instruction jloop and Instruction settar according to the present embodiment;

FIG. 47 is a diagram explaining a detailed behavior of the processor when executing Instruction "jloop C6, C1: C4, TAR, Ra";

FIG. 48 is a diagram explaining a detailed behavior of the processor when executing Instruction "settar C6, C1: C4, D9";

FIG. 49 is a diagram showing a source program written in the C language;

FIG. 50 is a diagram showing an example machine language program to be generated by using Instruction jloop and Instruction settar according to the present embodiment;

FIG. 51 is a diagram showing a behavior to be performed in 4-stage software pipelining that uses the jloop and settar instructions shown respectively in FIGS. 47 and 48;

FIG. 53 is a diagram showing a behavior of 4-stage software pipelining in which instructions to be executed before and after the loop are incorporated respectively into a prolog phase and an epilog phase;

FIG. 55 is a diagram explaining further another example method of setting the conditional flag C6 for Instruction jloop shown in FIG. 47; and FIG. 56 is a diagram showing a behavior of an existing processor using 4-stage software pipelining.

DETAILED DESCRIPTION OF THE PREFERRED EMBODIMENT

An explanation is given for the architecture of the processor according to the present invention. The processor of the present invention is a general-purpose processor which has been developed targeting at the field of AV (Audio Visual) media signal processing technology, and instructions issued in this processor offer a higher degree of parallelism than in ordinary microcomputers. By being used as a core common to mobile phones, mobile AV devices, digital televisions, DVDs (Digital Versatile discs) and others, the processor can improve software reusability. Furthermore, this processor allows multiple high-performance media processes to be performed with high cost effectiveness, and provides a development environment for high-Level languages intended for improving development efficiency.

Figure 1:
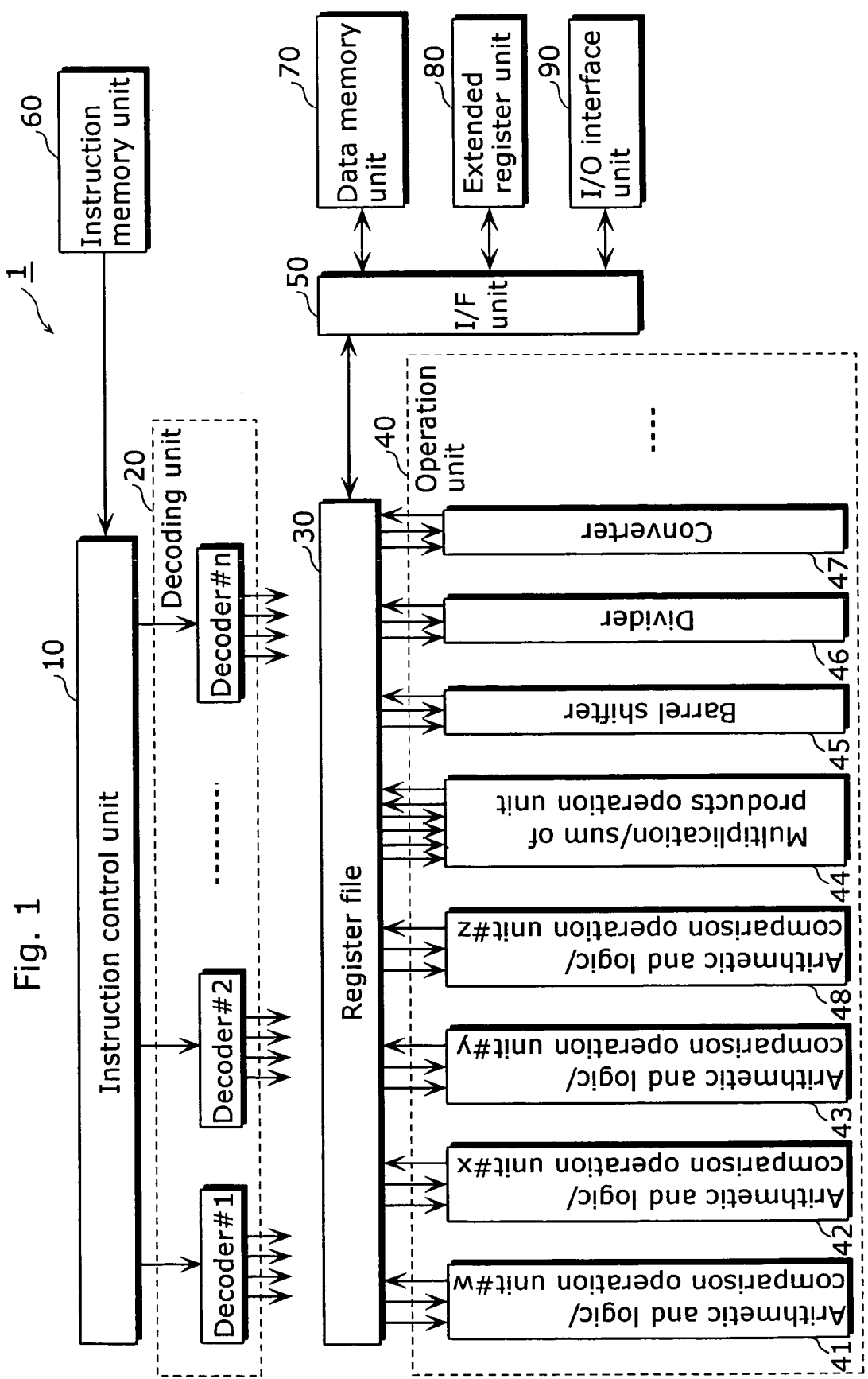
FIG. 1 is a schematic block diagram showing a processor according to the present invention.

FIG. 1 is a schematic block diagram showing the processor according to the present invention. The processor 1 is comprised of an instruction control unit 10, a decoding unit 20, a register file 30, an operation unit 40, an I/F (interface) unit 50, an instruction memory unit 60, a data memory unit 70, an extended register unit 80, and an I/O (Input/Output) interface unit 90.

The operation unit 40 includes arithmetic and logic/comparison operation units 41-43 and 48, a multiplication/sum of products operation unit 44, a barrel shifter 45, a divider 46, and a converter 47 for performing operations of SIMD instructions. The multiplication/sum of products operation unit 44 is capable of performing accumulation which results in a maximum of a 65-bit operation result, without lowering bit precision. The multiplication/sum of products operation unit 44 is also capable of executing SIMD instructions as in the case of the arithmetic and logic/comparison operation units 41-43 and 48. Furthermore, the processor 1 is capable of parallel execution of an arithmetic and logic/comparison operation instruction on a maximum of four data elements.

Figure 2:
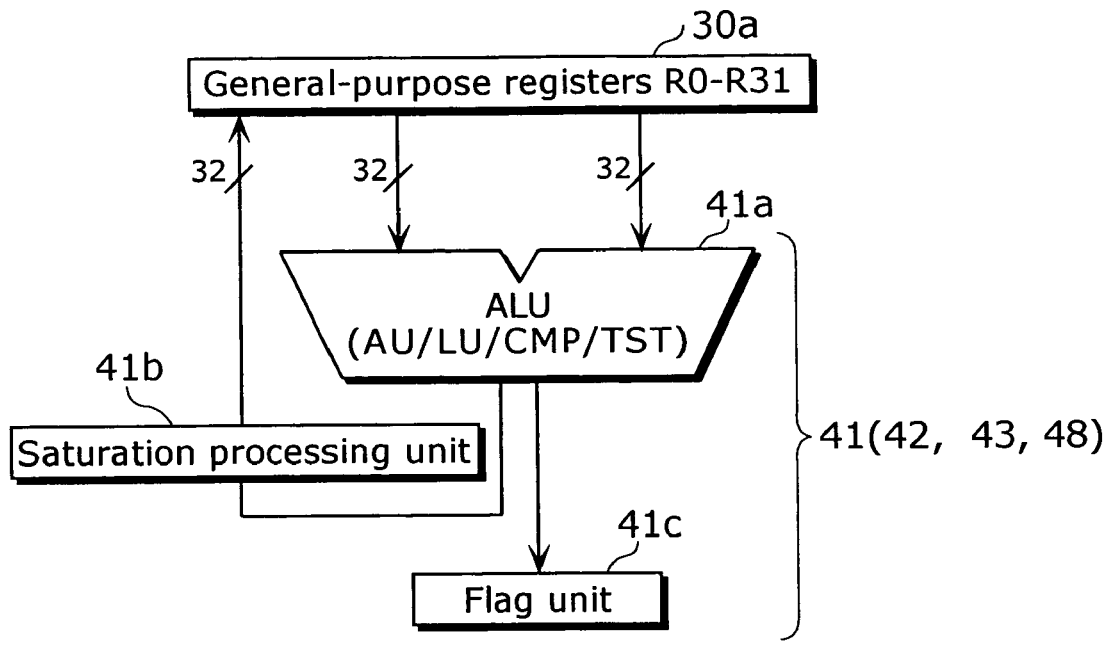
FIG. 2 is a schematic diagram showing arithmetic and logic/comparison operation units of the processor.

FIG. 2 is a schematic diagram showing the arithmetic and logic/comparison operation units 41-43 and 48. Each of the arithmetic and logic/comparison operation units 41-43 and 48 is made up of an ALU (Arithmetic and Logical Unit) 41a, a saturation processing unit 41b, and a flag unit 41c. The ALU 41a includes an arithmetic operation unit (AU), a logical operation unit (LU), a comparator (CMP), and a TST. The bit widths of operation data to be supported by the ALU 41a are 8 bits (when using four operation units in parallel), 16 bits (when using two operation units in parallel) and 32 bits (when using one operation unit to process 32-bit data). For a result of an arithmetic operation, the flag unit 41c and the like detects an overflow and generates a conditional flag. For a result of each of the operation units, the comparator and the TST, an arithmetic shift right, saturation by the saturation processing unit 41b, the detection of maximum/minimum values, and absolute value generation processing are performed.

Figure 3:
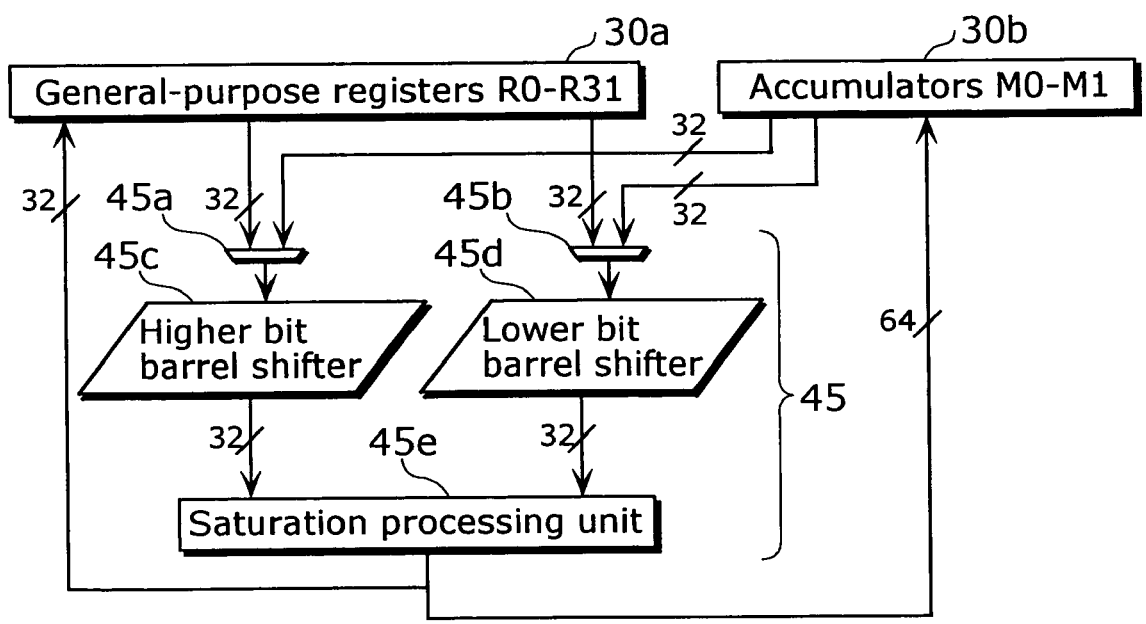
FIG. 3 is a block diagram showing a configuration of a barrel shifter of the processor.

FIG. 3 is a block diagram showing the configuration of the barrel shifter 45. The barrel shifter 45 is made up of selectors 45a and 45b, a higher bit barrel shifter 45c, a lower bit barrel shifter 45d, and a saturation processing unit 45e. This barrel shifter 45 executes an arithmetic shift of data (shift in the 2's complement number system) or a logical shift of data (unsigned shift). Usually, 32-bit or 64-bit data is inputted to and outputted from the barrel shifter 45. The amount of shifting data stored in the register 30a or 30b is specified by another register or according to its immediate value. The barrel shifter 45 performs an arithmetic or logical shift of input data in the range of left 63 bits and right 63 bits, and outputs data of the same bit length as that of the input data.

The barrel shifter 45 is also capable of shifting 8-, 16-, 32-, or 64-bit data in response to a SIMD instruction. For example, the barrel shifter 45 can shift four pieces of 8-bit data in parallel.

An arithmetic shift, which is a shift in the 2's complement number system, is performed for decimal point alignment at the time of addition and subtraction, for multiplication of powers of 2 (the $1^{st}$ power of 2, the $2^{nd}$ power of 2, the $-1$st power of 2, the $-2^{nd}$ power of 2) and other purposes.

Figure 4:
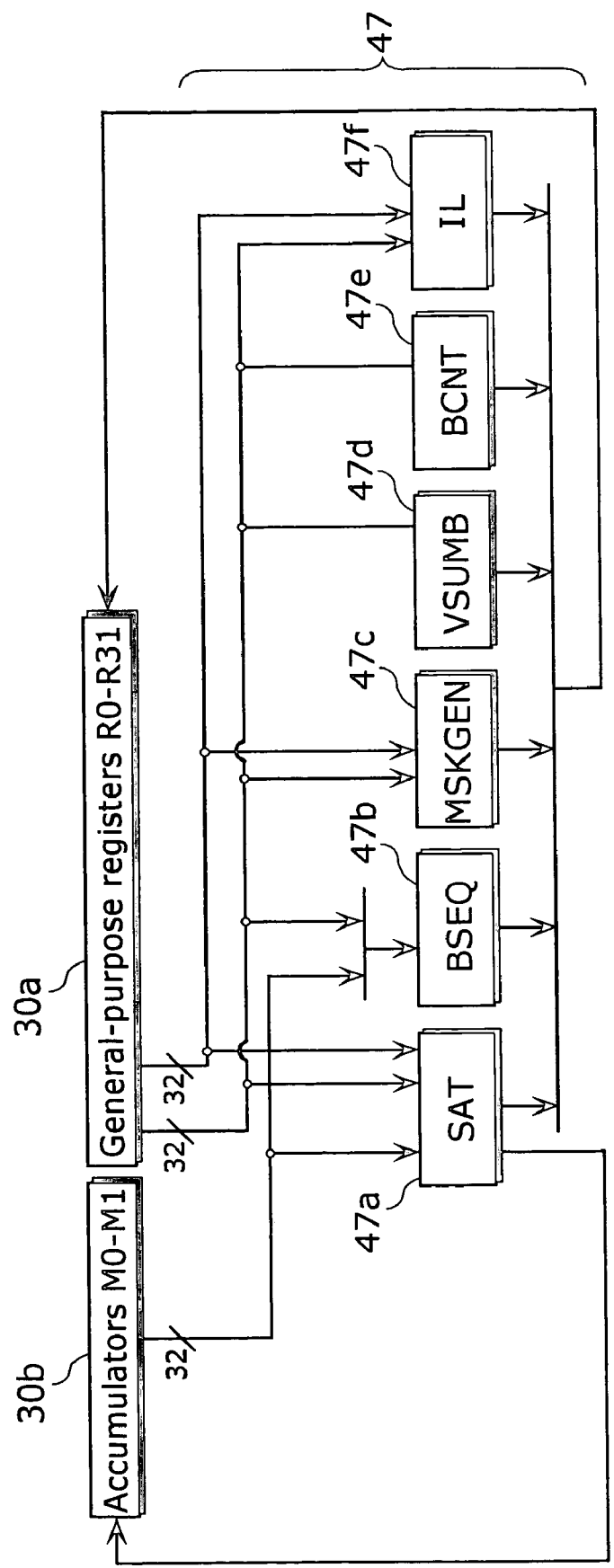
FIG. 4 is a block diagram showing a configuration of a converter of the processor.

FIG. 4 is a block diagram showing the configuration of the converter 47. The converter 47 includes a saturation block (SAT) 47a, a BSEQ block 47b, an MSKGEN block 47c, a VSUMB block 47d, a BCNT block 47e, and an IL block 47f.

The saturation block (SAT) 47a performs saturation processing on input data. By having two blocks for performing saturation processing on 32-bit data, the saturation block (SAT) 47a supports a SIMD instruction executed on two data elements in parallel.

The BSEQ block 47b counts consecutive 0s or 1s from the MSB (Most Significant Bit).

The MSKGEN block 47c outputs a specified bit segment as 1, while outputting the others as 0.

The VSUMB block 47d divides the input data into specified bit widths, and outputs their total sum.

The BCNT block 47e counts the number of bits in the input data specified as 1.

The IL block 47f divides the input data into specified bit widths, and outputs a value that results from exchanging the positions of data blocks.

Figure 5:
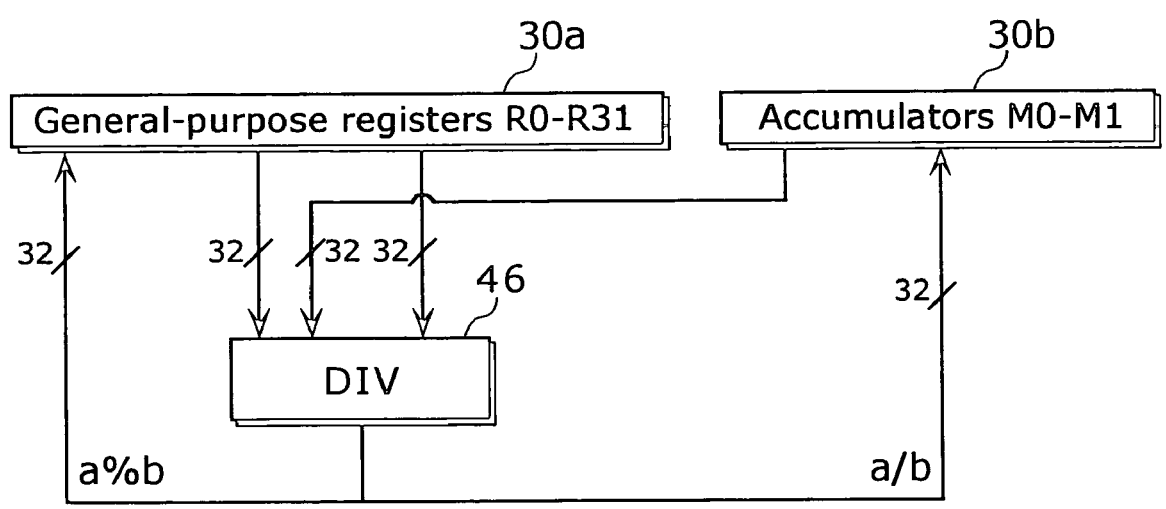
FIG. 5 is a block diagram showing a configuration of a divider of the processor.

FIG. 5 is a block diagram showing the configuration of the divider 46. With a dividend being 64 bits and a divisor being 32 bits, the divider 46 outputs 32 bit data as a quotient and a modulo, respectively. 34 cycles are involved for obtaining a quotient and a modulo. The divider 46 can handle both singed and unsigned data. Note, however, that whether or not to sign a dividend and a divisor is common between them. The divider 46 is also capable of outputting an overflow flag, and a 0 division flag.

Figure 6:
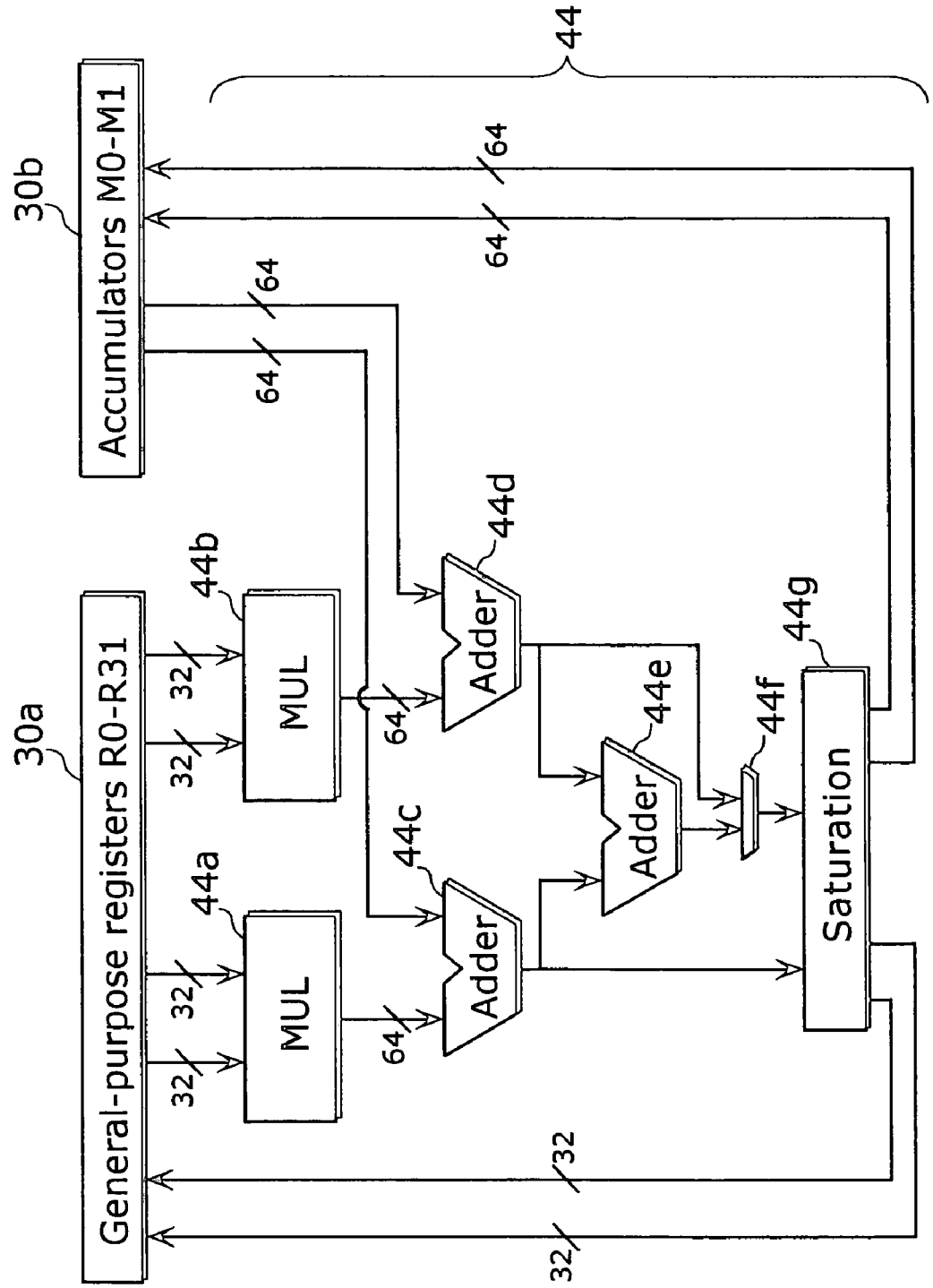
FIG. 6 is a block diagram showing a configuration of a multiplication/sum of products operation unit of the processor.

FIG. 6 is a block diagram showing the configuration of the multiplication/sum of products operation unit 44. The multiplication/sum of products operation unit 44, which is made up of two 32-bit multipliers (MUL) 44a and 44b, three 64-bit adders (Adder) 44c-44e, a selector 44f and a saturation processing unit (Saturation) 44g, performs the following multiplications and sums of products:

Multiplication, sum of products, and difference of products on signed 32×32-bit data;

Multiplication on signed 32×32-bit data;

Multiplication, sum of products, and difference of products on two signed 16×16-bit data in parallel; and Multiplication, sum of products, and difference of products on two 32×16-bit signed data in parallel.

The above operations are performed on data in integer and fixed point format (h1, h2, w1, and w2). Also, the results of these operations are rounded and saturated.

Figure 7:
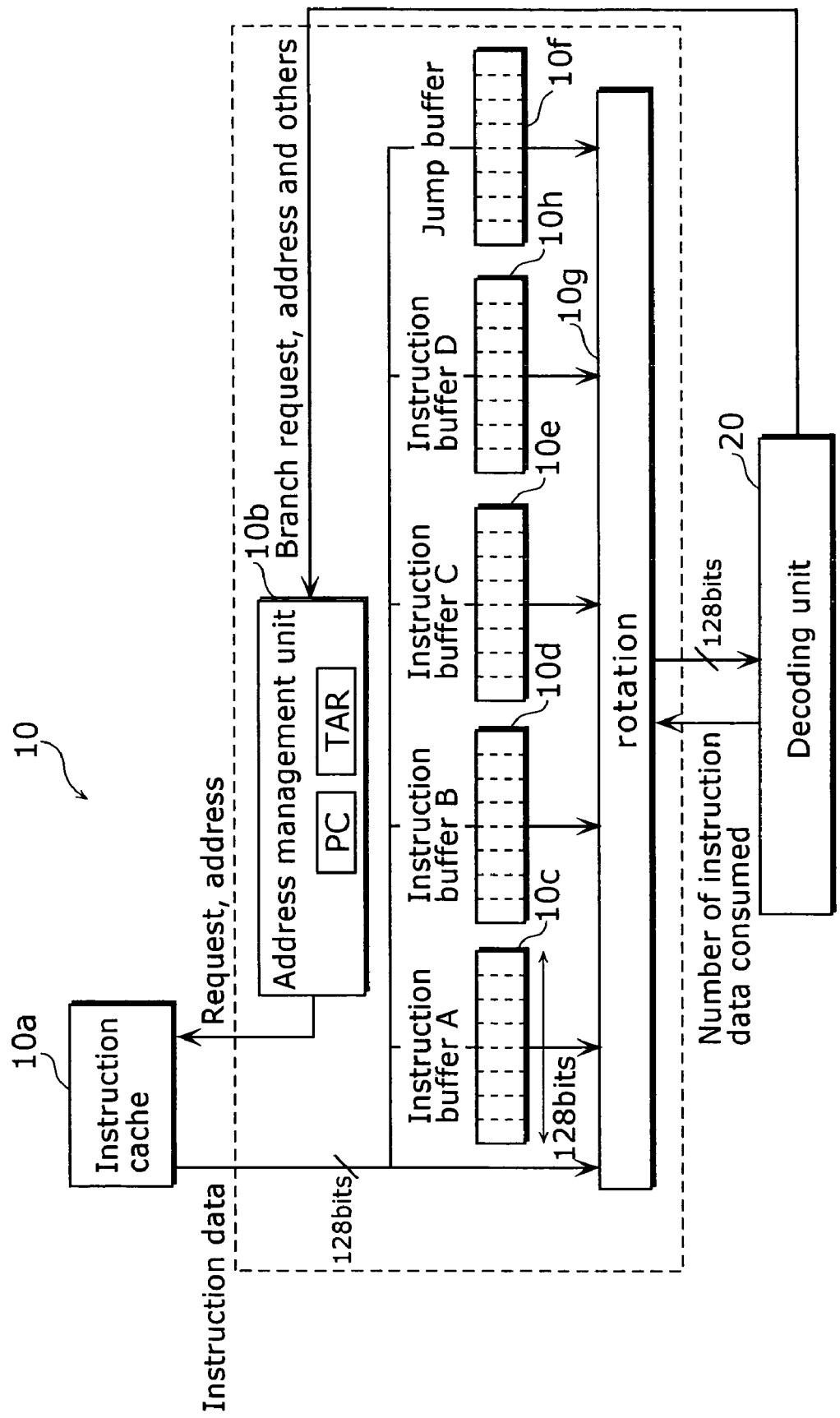
FIG. 7 is a block diagram showing a configuration of an instruction control unit of the processor.

FIG. 7 is a block diagram showing the configuration of the instruction control unit 10. The instruction control unit 10, which is made up of an instruction cache 10a, an address management unit 10b, instruction buffers 10c-10e and 10h, a jump buffer 10f, and a rotation unit (rotation) 10g, issues instructions at ordinary times and at branch points. By having four 128-bit instruction buffers (the instruction buffers 10c-10e and 10h), the instruction control unit 10 supports the maximum number of parallel instruction execution. Regarding branch processing, the instruction control unit 10 stores, in advance, a branch target instruction into the jump buffer 10f and stores a branch target address into the below-described TAR register before performing a branch (settar instruction). Thus, the instruction control unit 10 performs the branch by using the branch target address stored in the TAR register and the branch target instruction stored in the jump buffer 10f.

Note that the processor 1 is a processor with a VLIW architecture. The VLIW architecture is an architecture that allows a plurality of instructions (e.g. load, store, operation, and branch) to be stored in a single instruction word, and allows such instructions to be executed all at once. If a programmer describes a set of instructions which can be executed in parallel as a single issue group, it is possible for such issue group to be processed in parallel. In this specification, the delimiter of an issue group is indicated by ";;". Notational examples are described below.

Example 1 mov r1, 0x23;;

This instruction description indicates that only an instruction "mov" shall be executed.

Example 2 mov r1, 0x38
add r0, r1, r2
sub r3, r1, r2;;

These instruction descriptions indicate that three instructions of "mov", "add" and "sub" shall be executed in parallel.

The instruction control unit 10 identifies an issue group and sends the identified issue group to the decoding unit 20. The decoding unit 20 decodes the instructions in the issue group, and controls resources required for executing such instructions.

Next, an explanation is given for registers included in the processor 1.

Table 1 below lists a set of registers of the processor 1.

TABLE 1

| Register name | Bit width | No. of registers | Usage |
| --- | --- | --- | --- |
| R0-R31 | 32 bits | 32 | General-purpose registers. Used as data memory pointer, data storage at the time of operation instruction, and the like. |
| TAR | 32 bits | 1 | Branch register. Used as branch address storage at branch point. |
| LR | 32 bits | 1 | Link register. |
| SVR | 16 bits | 2 | Save register. Used for saving conditional flag (CFR) and various modes. |
| M0-M1 (MH0:ML0- MH1~ML1) | 64 bits | 2 | Operation registers. Used as data storage when operation instruction is executed. |

Table 2 below lists a set of flags (flags managed in a conditional flag register and the like described later) of the processor 1.

TABLE 2

| Flag name | Bit width | No. of flags | Usage |
|---|---|---|---|
| C0-C7 | 1 | 8 | Conditional flags. Indicate if condition is true or false. |
| VC0-VC3 | 1 | 4 | Conditional flags for media processing extension instruction. Indicate if condition is true or false. |
| OVS | 1 | 1 | Overflow flag. Detects overflow at the time of operation. |
| CAS | 1 | 1 | Carry flag. Detects carry at the time of operation. |
| BPO | 5 | 1 | Specifies bit position. Specifies bit positions to be processed when mask processing instruction is executed. |
| ALN | 2 | 1 | Specified byte alignment. |
| FXP | 1 | 1 | Fixed point arithmetic mode. |
| UDR | 32 | 1 | Undefined register. |

Figure 8:
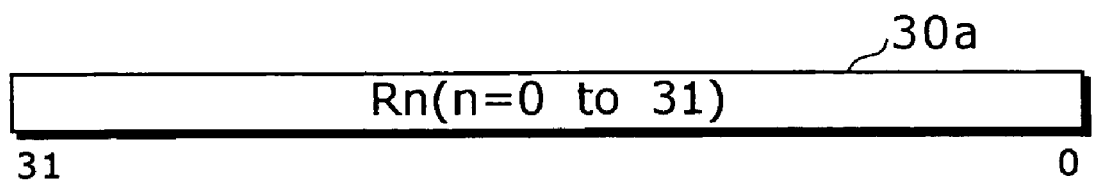
FIG. 8 is a diagram showing a configuration of general-purpose registers (R0-R31) of the processor.

FIG. 8 is a diagram showing the configuration of the general-purpose registers (R0-R31) 30a. The general-purpose registers (R0-R31) 30a are a group of 32-bit registers that constitute an integral part of the context of a task to be executed and that store data or addresses. Note that the general-purpose registers R30 and R31 are used by hardware as a global pointer and a stack pointer, respectively.

Figure 9:
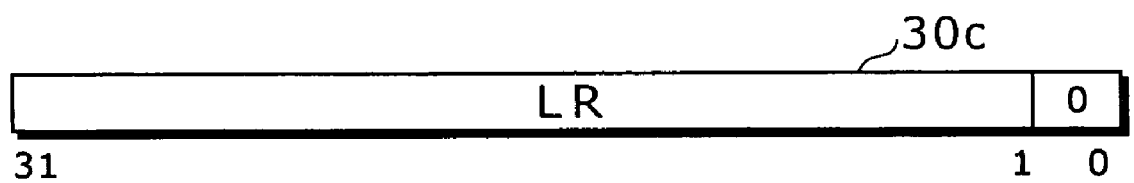
FIG. 9 is a diagram showing a configuration of a link register (LR) of the processor.

FIG. 9 is a diagram showing the configuration of a link register (LR) 30c. In connection with this link register (LR) 30c, the processor 1 also has a save register (SVR) which is not illustrated in FIG. 9. The link register (LR) 30c is a 32-bit register in which a return address at the time of a function call is stored. Note that the save register (SVR) is a 16-bit register for saving a conditional flag (CFR.CF) of the conditional flag register at the time of a function call. The link register (LR) 30c is also used for the purpose of increasing the speed of loops, as in the case of a branch register (TAR) to be explained later. 0 is always read out from the low 1 bit of the link register (LR) 30c, and 0 must be written to the low 1 bit of the link register (LR) 30c at the time of writing.

For example, when executing "call (brl, jmpl)" instructions, the processor 1 saves a return address into the link register (LR) 30c and saves a conditional flag (CFR.CF) into the save register (SVR). When executing a "jmp" instruction, the processor 1 fetches the return address (branch destination address) from the link register (LR) 30c, and restores a program counter (PC). Furthermore, when executing a "ret (jmpr)" instruction, the processor 1 fetches the branch destination address (return address) from the link register (LR) 30c, and stores (restores) the branch destination address into the program counter (PC). Moreover, the processor 1 fetches the conditional flag from the save register (SVR) so as to store (restore) the conditional flag into a conditional flag area CFR.CF in the conditional flag register (CFR) 32.

Figure 10:
FIG. 10 is a diagram showing a configuration of a branch register (TAR) of the processor.

FIG. 10 is a diagram showing the configuration of the branch register (TAR) 30d. The branch register (TAR) 30d is a 32-bit register in which a branch target address is stored, and which is used mainly for the purpose of increasing the speed of loops. 0 is always read out from the low 1 bit of the branch resister (TAR) 30d, and 0 must be written to the low 1 bit of the branch resister (TAR) 30d at the time of writing.

For example, when executing "jmp" and "jloop" instructions, the processor 1 fetches a branch target address from the branch register (TAR) 30d, and stores the branch target address in the program counter (PC). When the instruction indicated by the address stored in the branch register (TAR) 30d is stored in a branch instruction buffer, a branch penalty will be 0. An increased loop speed can be achieved by storing the top address of a loop in the branch register (TAR) 30d.

FIG. 11 is a diagram showing the configuration of a program status register (PSR) 31. The program status register (PSR) 31, which constitutes an integral part of the context of a task to be executed, is a 32-bit register in which the following processor status information are stored:

Bit SWE: indicates whether the switching of VMP (Virtual Multi-Processor) to LP (Logical Processor) is enabled or disabled. "0" indicates that switching to LP is disabled and "1" indicates that switching to LP is enabled.

Bit FXP: indicates a fixed point mode. "0" indicates mode 0 and "1" indicates mode 1.

Bit IH: is an interrupt processing flag indicating whether or not maskable interrupt processing is ongoing. "1" indicates that there is an ongoing interrupt processing and "0" indicates that there is no ongoing interrupt processing. "1" is automatically set on the occurrence of an interrupt. This flag is used to make a distinction of which one of interrupt processing and program processing is taking place at a point in the program to which the processor returns in response to a "rti" instruction.

Bit EH: is a flag indicating whether or not an error or an NMI is being processed. "0" indicates that error processing or NMI interrupt processing is not ongoing and "1" indicates that error processing or NMI interrupt processing is ongoing. This flag is masked if an asynchronous error or an NMI occurs when EH=1. Meanwhile, when VMP is enabled, plate switching of VMP is masked.

Bit PL [1:0]: indicates a privilege level. "00" indicates the privilege level 0, i.e. the processor abstraction level, "01" indicates the privilege level 1 (non-settable), "10" indicates the privilege level 2, i.e. the system program level, and "11" indicates the privilege level 3, i.e. the user program level.

Bit LPIE3: indicates whether LP-specific interrupt 3 is enabled or disabled. "1" indicates that an interrupt is enabled and "0" indicates that an interrupt is disabled.

Bit LPIE2: indicates whether LP-specific interrupt 2 is enabled or disabled. "1" indicates that an interrupt is enabled and "0" indicates that an interrupt is disabled.

Bit LPIE1: indicates whether LP-specific interrupt 1 is enabled or disabled. "1" indicates that an interrupt is enabled and "0" indicates that an interrupt is disabled.

Bit LPIE0: indicates whether LP-specific interrupt 0 is enabled or disabled. "1" indicates that an interrupt is enabled and "0" indicates that an interrupt is disabled.

Bit AEE: indicates whether a misalignment exception is enabled or disabled. "1" indicates that a misalignment exception is enabled and "0" indicates that a misalignment exception is disabled.

Bit IE: indicates whether a level interrupt is enabled or disabled. "1" indicates that a level interrupt is enabled and "0" indicates a level interrupt is disabled.

Bit IM [7:0]: indicates an interrupt mask, and ranges from levels 0-7, each being able to be masked at its own level. Level 0 is the highest level. Of the interrupt requests which are not masked by any IMs, only the interrupt request with the highest level is accepted by the processor 1. When the interrupt request is accepted, levels below the level of the accepted interrupt request are automatically masked by hardware. IM[0] denotes a mask of level 0, IM[1] denotes a mask of level 1, IM[2] denotes a mask of level 2, IM[3] denotes a mask of level 3, IM[4] denotes a mask of level 4, IM[5] denotes a mask of level 5, IM[6] denotes a mask of level 6, and IM[7] denotes a mask of level 7.

reserved: indicates a reserved bit. 0 is always read out from "reserved". 0 must be written to "reserved" at the time of writing.

FIG. 12 is a diagram showing the configuration of the conditional flag register (CFR) 32. The conditional flag register (CFR) 32, which constitutes an integral part of the context of a task to be executed, is a 32-bit register made up of conditional flags, operation flags, vector conditional flags, an operation instruction bit position specification field, and a SIMD data alignment information field.

Bit ALN [1:0]: indicates an alignment mode. An alignment mode of "valnvc" instruction is set.

Bit BPO [4:0]: indicates a bit position. It is used in an instruction that requires a bit position specification.

Bit VC0-VC3: are vector conditional flags. Starting from a byte on the LSB (Least Significant Bit) side or a half word through to the MSB side, each corresponds to a flag ranging from VC0 through VC3.

Bit OVS: is an overflow flag (summary). It is set on the detection of saturation and overflow. If not detected, a value before the execution of the instruction is retained. Clearing of this flag needs to be carried out by software.

Bit CAS: is a carry flag (summary). It is set when a carry occurs under an "addc" instruction, or when a borrow occurs under a "subc" instruction. If there is no occurrence of a carry under an "addc" instruction or a borrow under a "subc" instruction, a value before the execution of the instruction is retained as the Bit CAS. Clearing of this flag needs to be carried out by software.

Bit C0-C7: are conditional flags. The value of the flag C7 is always 1. A reflection of a FALSE condition (writing of 0) made to the flag C7 is ignored.

reserved: indicates a reserved bit. 0 is always read out from "reserved". 0 must be written to "reserved" at the time of writing.

Figure 13:
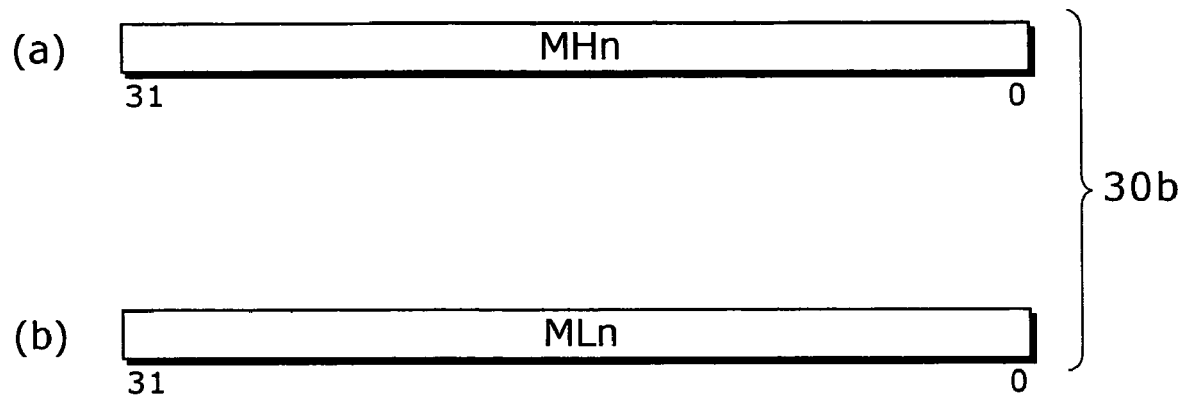
FIG. 13 is a diagram showing a configuration of accumulators (M0, M1) of the processor.

FIGS. 13(a) and (b) are diagrams showing the configuration of accumulators (M0, M1) 30b. Such accumulators (M0, M1) 30b, which constitute an integral part of the context of a task to be executed, are made up of a 32-bit register MH0-MH1 (register for multiply and divide/sum of products (the higher 32 bits)) shown in (a) in FIG. 13 and a 32-bit register ML0-ML1 (register for multiply and divide/sum of products (the lower 32 bits)) shown in (b) in FIG. 13.

The register MH0-MH1 is used for storing the higher 32 bits of an operation result at the time of a multiply instruction, whereas the register MH0-MH1 is used as the higher 32 bits of the accumulators at the time of a sum of products instruction. Moreover, the register MH0-MH1 can be used in combination with the general-purpose registers in the case where a bit stream is handled. Meanwhile, the register ML0-ML1 is used for storing the lower 32 bits of an operation result at the time of a multiply instruction, whereas the register ML0-ML1 is used as the lower 32 bits of the accumulators at the time of a sum of products instruction.

Figure 14:
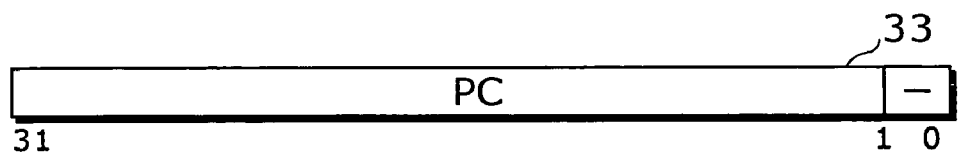
FIG. 14 is a diagram showing a configuration of a program counter (PC) of the processor.

FIG. 14 is a diagram showing the configuration of a program counter (PC) 33. This program counter (PC) 33, which constitutes an integral part of the context of a task to be executed, is a 32-bit counter that holds the address of an instruction being executed. "0" is always stored in the low 1 bit of the program counter (PC) 33.

Figure 15:
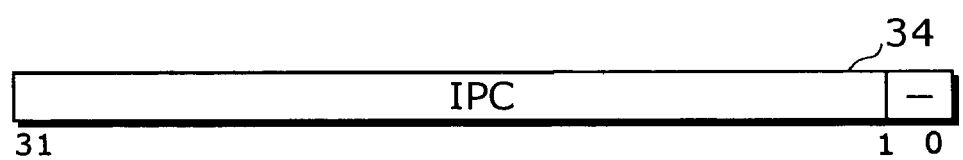
FIG. 15 is a diagram showing a configuration of a PC save register (IPC) of the processor.

FIG. 15 is a diagram showing the configuration of a PC save register (IPC) 34. This PC save register (IPC) 34, which constitutes an integral part of the context of a task to be executed, is a 32-bit register. "0" is always read out from the low 1 bit of the PC save register (IPC) 34. "0" must be written to the low 1 bit of the PC save register (IPC) 34 at the time of writing.

Figure 16:
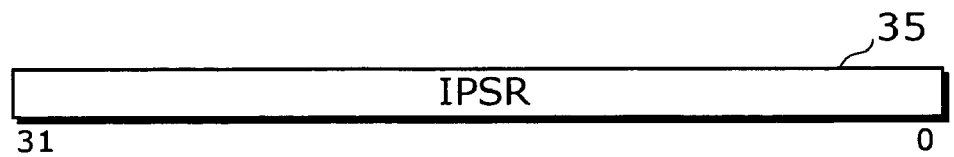
FIG. 16 is a diagram showing a configuration of a PSR save register (IPSR) of the processor.

FIG. 16 is a diagram showing the configuration of a PSR save register (IPSR) 35. This PSR save register (IPSR) 35, which constitutes an integral part of the context of a task to be executed, is a 32-bit register for saving the program status register (PSR) 31. 0 must be always read out from a part in the PSR save register (IPSR) 35 corresponding to a reserved bit in the program status register (PSR) 31, and 0 must be written to a part in the PSR save register (IPSR) 35 corresponding to a reserved bit in the program status register (PSR) 31 at the time of writing.

Next, an explanation is given for the memory space of the processor 1. In the processor 1, a linear memory space with a capacity of 4 GB is divided into 32 segments, and an instruction SRAM (Static RAM) and a data SRAM are allocated to 128-MB segments. With a 128-MB segment serving as one block, a target block to be accessed is set in a SAR (SRAM Area Register). A direct access is made to the instruction SRAM/data SRAM when the accessed address is a segment set in the SAR, but an access request shall be issued to a bus controller (BUC) when such address is not a segment set in the SAR. An on chip memory (OCM), an external memory, an external device, an I/O port and others are connected to the BUC. The processor 1 is capable of reading/writing data from and to these devices.

Figure 17:
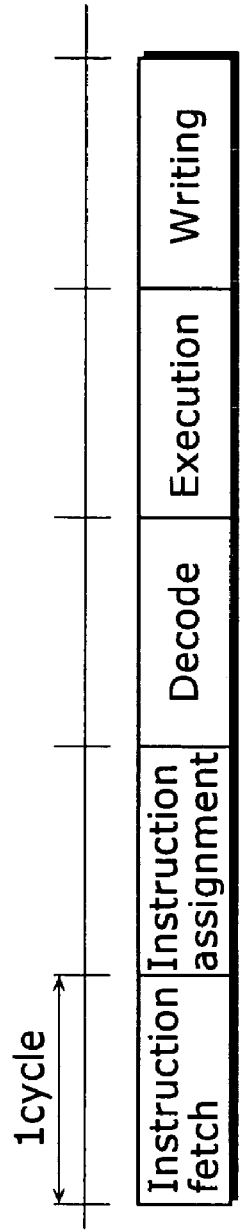
FIG. 17 is a timing diagram showing a pipeline behavior of the processor.

FIG. 17 is a timing diagram showing the pipeline behavior of the processor 1. As illustrated in FIG. 17, the pipeline of the processor 1 basically consists of the following five stages: instruction fetch; instruction assignment (dispatch); decode; execution; and writing.

Figure 18:
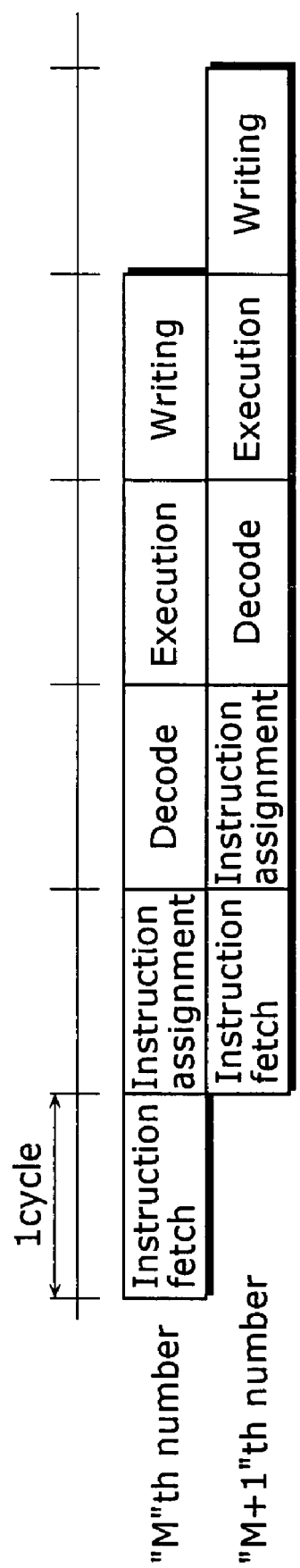
FIG. 18 is a timing diagram showing each pipeline behavior when instructions are executed by the processor.

FIG. 18 is a timing diagram showing each stage of the pipeline behavior of the processor 1 at the time of executing an instruction. In the instruction fetch stage, an access is made to an instruction memory which is indicated by an address specified by the program counter (PC) 33, and the instruction is transferred to the instruction buffers 10c-10e and 10h, and the like. In the instruction assignment stage, the output of branch target address information in response to a branch instruction, the output of an input register control signal, and the assignment of a variable length instruction are carried out, which is followed by the transfer of the instruction to an instruction register (IR). In the decode stage, the instruction stored in the IR is inputted to the decoding unit 20, from which an operation unit control signal and a memory access signal are outputted. In the execution stage, an operation is executed and the result of the operation is outputted either to the data memory or the general-purpose registers (R0-R31) 30a. In the writing stage, a value obtained as a result of data transfer, and the operation results are stored in the general-purpose registers.

Figure 19:
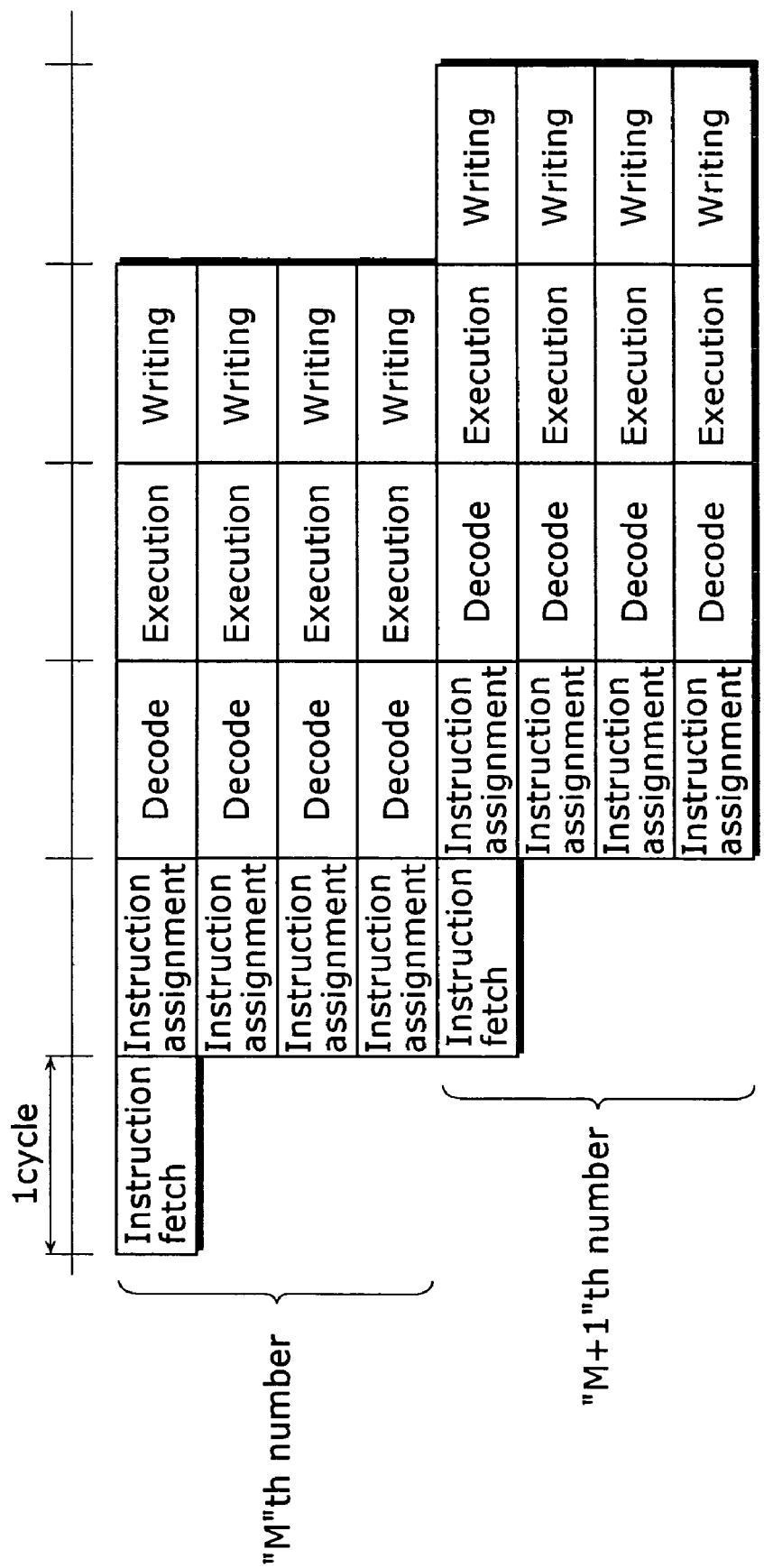
FIG. 19 is a diagram showing a parallel behavior of the processor.

The VLIW architecture of the processor 1 allows parallel execution of the above processing on a maximum of four data elements. Therefore, the processor 1 performs parallel execution as shown in FIG. 18 at the timing shown in FIG. 19.

Next, an explanation is given for a set of instructions executed by the processor 1 with the above configuration.

Tables 3-5 list categorized instructions to be executed by the processor 1.

TABLE 3

| Category | Operation unit | Instruction operation code |
|---|---|---|
| Memory move instruction (load) | M | ld,ldh,ldhu,ldb,ldbu,ldp,ldhp,ldbp,ldbh, ldbuh,ldbhp,ldbuhp |
| Memory move instruction (store) | M | st,sth,stb,stp,sthp,stbp,stbh,stbhp |
| Memory move instruction (others) | M | dpref,ldstb |
| External register move instruction | M | rd,rde,wt,wte |
| Branch instruction | B | br,brl,call,jmp,jmpl,jmpr,ret,jmpf,jloop, setbb,setlr,settar |
| Software interrupt instruction | B | rti,pi0,pi0l,pi1,pi1l,pi2,pi2l,pi3,pi3l,pi4, pi4l,pi5,pi5l,pi6,pi6l,pi7,pi7l,sc0,sc1,sc2, sc3,sc4,sc5,sc6,sc7 |
| VMP/interrupt control instruction | B | intd,inte,vmpsleep,vmpsus,vmpswd,vmpswe, vmpwait |
| Arithmetic operation instruction | A | abs,absvh,absvw,add,addarvw,addc,addmsk, adds,addsr,addu,addvh,addvw,neg, negvh,negvw,rsub,s1add,s2add,sub, subc,submsk,subs,subvh,subvw,max, min |
| Logical operation instruction | A | and,andn,or,sethi,xor,not |
| Compare instruction | A | cmpCC,cmpCCa,cmpCCn,cmpCCo,tstn, tstna,tstnn,tstno,tstz,tstza,tstzn,tstzo |
| Move instruction | A | mov,movcf,mvclcas,mvclovs,setlo,vcchk |
| NOP instruction | A | nop |
| Shift instruction 1 | S1 | asl,aslvh,aslvw,asr,asrvh,asrvw,lsl,lsr, rol,ror |
| Shift instruction 2 | S2 | aslp,aslpvw,asrp,asrpvw,lslp,lsrp |

TABLE 4

| Category | Operation unit | Instruction operation code |
|---|---|---|
| Extract instruction | S2 | ext,extb,extbu,exth,exthu ,extr, extru,extu |
| Mask instruction | C | msk,mskgen |
| Saturation instruction | C | sat12,sat9,satb,satbu,sath,satw |
| Conversion instruction | C | valn,valn1,valn2,valn3,valnvc1,valnvc2, valnvc3,valnvc4,vhpkb,vhpkh,vhunpkb, vhunpkh,vintlhb,vintlhh,vintllb,vintllh, vlpkb,vlpkbu,vlpkh,vlpkhu,vlunpkb, vlunpkbu,vlunpkh,vlunpkhu,vstovb, vstovh,vunpk1,vunpk2, vxchngh,vexth |
| Bit count instruction | C | bcnt1,bseq,bseq0,bseq1 |
| Others | C | byterev,extw,mskbrvb,mskbrvh,rndvh, movp |
| Multiply instruction 1 | X1 | fmulhh,fmulhhr,fmulhw,fmulhww, hmul,lmul |
| Multiply instruction 2 | X2 | fmulww,mul,mulu |
| Sum of products instruction 1 | X1 | fmachh,fmachhr,fmachw,fmachww, hmac,lmac |
| Sum of products instruction 2 | X2 | fmacww,mac |
| Difference of products instruction 1 | X1 | fmsuhh,fmsuhhr,fmsuhw,fmsuww, hmsu,lmsu |
| Difference of products instruction 2 | X2 | fmsuww,msu |
| Divide instruction | DIV | div,divu |
| Debugger instruction | DBGM | dbgm0,dbgm1,dbgm2,dbgm3 |

TABLE 5

| Category | Operation unit | Instruction operation code |
|---|---|---|
| SIMD arithmetic operation instruction | A | vabshvh,vaddb,vaddh,vaddhvc,vaddhvh, vaddrhvc,vaddsb,vaddsh,vaddsrb,vaddsrh, vasubb,vcchk,vhaddh,vhaddhvh, vhsubh,vhsubhvh,vladdh,vladdhvh,vlsubh, vlsubhvh,vnegb,vnegh,vneghvh,vsaddb, vsaddh,vsgnh,vsrsubb,vsrsubh,vssubb, vssubh,vsubb,vsubh,vsubhvh,vsubsh, vsumh,vsumh2,vsumrh2,vxaddh, vxaddhvh,vxsubh,vxsubhvh, vmaxb,vmaxh,vminb,vminh,vmovt,vsel |
| SIMD compare instruction | A | vcmpeqb,vcmpeqh,vcmpgeb,vcmpgeh, vcmpgtb,vcmpgth,vcmpleb,vcmpleh, vcmpltb,vcmplth,vcmpneb,vcmpneh, vscmpeqb,vscmpeqh,vscmpgeb,vscmpgeh, vscmpgtb,vscmpgth,vscmpleb,vscmpleh, vscmpltb,vscmplth,vscmpneb,vscmpneh |
| SIMD shift instruction 1 | S1 | vaslb,vaslh,vaslvh,vasrb,vasrh,vasrvh, vlslb,vlslh,vlsrb,vlsrh,vrolb,vrolh,vrorb, vrorh |
| SIMD shift instruction 2 | S2 | vasl,vaslvw,vasr,vasrvw,vlsl,vlsr |
| SIMD saturation instruction | C | vsath,vsath12,vsath8,vsath8u,vsath9 |
| Other SIMD instruction | C | vabssumb,vrndvh |
| SIMD multiply instruction | X2 | vfmulh,vfmulhr,vfmulw,vhfmulh,vhfmulhr, vhfmulw,vhmul,vlfmulh,vlfmulhr,vlfmulw, vlmul,vmul,vpfmulhww,vxfmulh, vxfmulhr,vxfmulw,vxmul |
| SIMD sum of products instruction | X2 | vfmach,vfmachr,vfmacw,vhfmach,vhfmachr, vhfmacw,vhmac,vlfmach,vlfmachr, vlfmacw,vlmac,vmac,vpfmachww,vxfmach, vxfmachr,vxfmacw,vxmac |
| SIMD difference of products instruction | X2 | vfmsuh,vfmsuw,vhfmsuh,vhfmsuw,vhmsu, vlfmsuh,vlfmsuw,vlmsu,vmsu,vxfmsuh, vxfmsuw,vxmsu |

Note that "Operation units" in the above tables refer to operation units used in the respective instructions. More specifically, "A" denotes an ALU instruction, "B" denotes a branch instruction, "C" denotes a conversion instruction, "DIV" denotes a divide instruction, "DBGM" denotes a debug instruction, "M" denotes a memory access instruction, "S1" and "S2" denote a shift instruction, and "X1" and "X2" denote a multiply instruction.

Figure 20A:
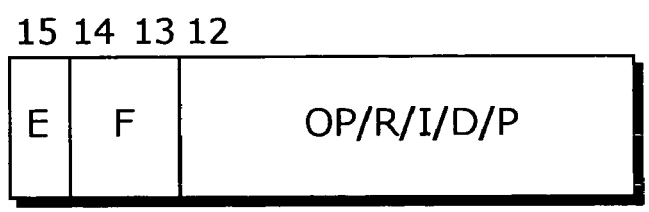
FIG. 20A is a diagram showing a format of a 16-bit instruction executed by the processor.
Figure 20B:
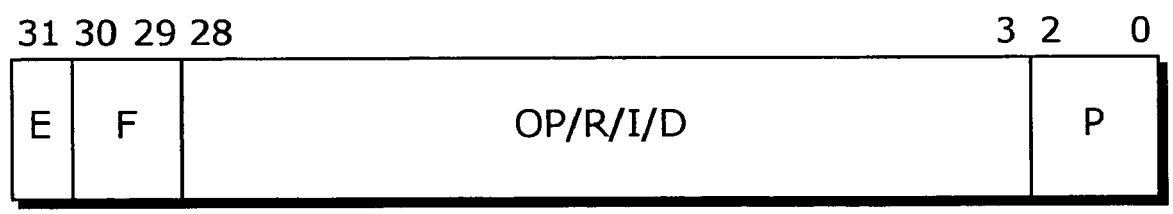
FIG. 20B is a diagram showing a format of a 32-bit instruction executed by the processor.

FIG. 20A is a diagram showing the format of a 16-bit instruction executed by the processor 1, and FIG. 20B is a diagram showing the format of a 32-bit instruction executed by the processor 1.

The following describes the meaning of the acronyms used in the diagrams: "E" is an end bit (boundary of parallel execution); "F" is a format bit (00, 01, 10: 16-bit instruction format, 11: 32-bit instruction format); "P" is a predicate (execution condition: one of the eight conditional flags C0-C7 is specified); "OP" is an operation code field; "R" is a register field; "I" is an immediate value field; and "D" is a displacement field. Note that an "E" field is unique to VLIW, and an instruction corresponding to E=0 is executed in parallel with the next instruction. In other words, the "E" field realizes VLIWs whose degree of parallelism is variable. Furthermore, predicates, which are flags for controlling whether or not to execute an instruction based on values of the conditional flags C0-C7, serve as a technique that allows instructions to be selectively executed without using a branch instruction and therefore accelerates the speed of processing.

For example, when the conditional flag C0 indicating a predicate in an instruction is 1, the instruction being assigned the conditional flag C shall be executed, whereas when the conditional flag C0 is 0, such instruction shall not be executed.

FIGS. 21A-36B are diagrams explaining an outlined functionality of the instructions executed by the processor 1. More specifically, FIGS. 21A and 21B explain instructions belonging to the category "ALUadd (addition) system)"; FIGS. 22A and 22B explain instructions belonging to the category "ALUsub (subtraction) system)"; FIGS. 23A and 23B explain instructions belonging to the category "ALU-logic (logical operation) system and others"; FIGS. 24A and 24B explain instructions belonging to the category "CMP (comparison operation) system"; FIGS. 25A and 25B explain instructions belonging to the category "mul (multiplication) system"; FIGS. 26A and 26B explain instructions belonging to the category "mac (sum of products operation) system"; FIGS. 27A and 27B explain instructions belonging to the category "msu (difference of products) system"; FIGS. 28A and 28B explain instructions belonging to the category "MEMld (load from memory) system"; FIGS. 29A and 29B explain instructions belonging to the category "MEMstore (store in memory) system"; FIG. 30 explains instructions belonging to the category "BRA (branch) system"; FIGS. 31A and 31B explain instructions belonging to the category "BSasl (arithmetic barrel shift) system and others"; FIGS. 32A and 32B explain instructions belonging to the category "BSlsr (logical barrel shift) system and others"; FIG. 33 explains instructions belonging to the category "CNVvaln (arithmetic conversion) system"; FIGS. 34A and 34B explain instructions belonging to the category "CNV (general conversion) system"; FIG. 35 explains instructions belonging to the category "SATvlpk (saturation processing) system"; and FIGS. 36A and 36B explain instructions belonging to the category "ETC (et cetera) system".

The following describes the meaning of each item in these diagrams: "SIMD" indicates the type of an instruction (distinction between SISD (SINGLE) and SIMD); "Size" indicates the size of an individual operand to be an operation target; "Instruction" indicates the operation code of an instruction; "Operand" indicates the operands of an instruction; "CFR" indicates a change in the conditional flag register; "PSR" indicates a change in the processor status register; "Typical behavior" indicates the overview of a behavior; "Operation unit" indicates an operation unit to be used; and "3116" indicates the size of an instruction.

Next, the behavior of the processor 1 when executing some of the characteristic instructions is explained. Note that tables 6-10 describe the meaning of each symbol used to explain the instructions.

TABLE 6

| Symbol | Meaning |
|---|---|
| X[i] | Bit number i of X |
| X[i:j] | Bit number j to bit number i of X |
| X:Y | Concatenated X and Y |
| {n{X}} | n repetitions of X |
| sextM(X,N) | Sign-extend X from N bit width to M bit width. Default of M is 32. Default of N is all possible bit widths of X. |
| uextM(X,N) | Zero-extend X from N bit width to M bit width. Default of M is 32. Default of N is all possible bit widths of X. |
| smul(X,Y) | Signed multiplication X * Y |
| umul(X,Y) | Unsigned multiplication X * Y |
| sdiv(X,Y) | Integer part in quotient of signed division X/Y |

TABLE 6-continued

| Symbol | Meaning |
|---|---|
| smod(X,Y) | Modulo with the same sign as dividend. |
| udiv(X,Y) | Quotient of unsigned division X/Y |
| umod(X,Y) | Modulo |
| abs(X) | Absolute value |
| bseq(X,Y) | for (i=0; i<32; i++) { if (X[31−i] != Y) break; } result = i; |
| bcnt(X,Y) | S = 0; for (i=0; i<32; i++) { if (X[i] == Y) S++; } result = S; |
| max(X,Y) | result = (X > Y)? X:Y |
| min(X,Y) | result = (X < Y)? X:Y; |
| tstz(X,Y) | X & Y == 0 |
| tstn(X,Y) | X & Y != 0 |

TABLE 7

| Symbol | | Meaning | |
|---|---|---|---|
| Ra | Ra[31:0] | Register numbered a | (0 <= a <= 31) |
| Ra+1 | R(a+1)[31:0] | Register numbered a+1 | (0 <= a <= 30) |
| Rb | Rb[31:0] | Register numbered b | (0 <= b <= 31) |
| Rb+1 | R(b+1)[31:0] | Register numbered b+1 | (0 <= b <= 30) |
| Rc | Rc[31:0] | Register numbered c | (0 <= c <= 31) |
| Rc+1 | R(c+1)[31:0] | Register numbered c+1 | (0 <= c <= 30) |
| Ra2 | Ra2[31:0] | Register numbered a2 | (0 <= a2 <= 15) |
| Ra2+1 | R(a2+1)[31:0] | Register numbered a2+1 | (0 <= a2 <= 14) |
| Rb2 | Rb2[31:0] | Register numbered b2 | (0 <= b2 <= 15) |
| Rb2+1 | R(b2+1)[31:0] | Register numbered b2+1 | (0 <= b2 <= 14) |
| Rc2 | Rc2[31:0] | Register numbered c2 | (0 <= c2 <= 15) |
| Rc2+1 | R(c2+1)[31:0] | Register numbered c2+1 | (0 <= c2 <= 14) |
| Ra3 | Ra3[31:0] | Register numbered a3 | (0 <= a3 <= 7) |
| Ra3+1 | R(a3+1)[31:0] | Register numbered a3+1 | (0 <= a3 <= 6) |
| Rb3 | Rb3[31:0] | Register numbered b3 | (0 <= b3 <= 7) |
| Rb3+1 | R(b3+1)[31:0] | Register numbered b3+1 | (0 <= b3 <= 6) |
| Rc3 | Rc3[31:0] | Register numbered c3 | (0 <= c3 <= 7) |
| Rc3+1 | R(c3+1)[31:0] | Register numbered c3+1 | (0 <= c3 <= 6) |
| Rx | Rx[31:0] | Register numbered x | (0 <= x <= 3) |

TABLE 8

| Symbol | Meaning |
|---|---|
| + | Addition |
| − | Subtraction |
| & | Logical AND |
| \| | Logical OR |
| ! | Logical NOT |
| << | Logical shift left (arithmetic shift left) |
| >> | Arithmetic shift right |
| >>> | Logical shift right |
| ^ | Exclusive OR |
| ~ | Logical NOT |
| == | Equal |
| != | Not equal |
| > | Greater than Signed(regard left-and right-part MSBs as sign) |
| >= | Greater than or equal to Signed(regard left-and right-part MSBs as sign) |
| >(u) | Greater than Unsigned(Not regard left-and right-part MSBs as sign) |
| >=(u) | Greater than or equal to Unsigned(Not regard left-and right-part MSBs as sign) |
| < | Less than Signed(regard left-and right-part MSBs as sign) |
| <= | Less than or equal to Signed(regard left-and right-part MSBs as sign) |
| <(u) | Less than Unsigned(Not regard left-and right-part MSBs as sign) |

TABLE 8-continued

| Symbol | Meaning |
| --- | --- |
| <=(u) | Less than or equal to Unsigned(Not regard left-and right-part MSBs as sign) |

TABLE 9

| Symbol | Meaning |
| --- | --- |
| D(addr) | Double word data corresponding to address "addr" in Memory |
| W(addr) | Word data corresponding to address "addr" in Memory |
| H(addr) | Half data corresponding to address "addr" in Memory |
| B(addr) | Byte data corresponding to address "addr" in Memory |
| B(addr, bus_lock) | Access byte data corresponding to address "addr" in Memory, and lock used bus concurrently (unlockable bus shall not be locked) |
| B(addr, bus_unlock) | Access byte data corresponding to address "addr" in Memory, and unlock used bus concurrently (unlock shall be ignored for unlockable bus and bus which has not been locked) |
| EREG(num) | Extended register numbered "num" |
| EREG_ERR | To be 1 if error occurs when immediately previous access is made to extended register. To be 0, when there was no error. |
| <- | Write result |
| => | Synonym of instruction (translated by assembler) |
| reg # (Ra) | Register number of general-purpose register Ra(5-bit value) |
| 0x | Prefix of hexadecimal numbers |
| 0b | Prefix of binary numbers |
| tmp | Temporally variable |
| UD | Undefined value (value which is implementation-dependent value or which varies dynamically) |
| Dn | Displacement value (n is a natural value indicating the number of bits) |
| In | Immediate value (n is a natural value indicating the number of bits) |

TABLE 10

| Symbol | Meaning |
| --- | --- |

○Explanation for syntax
if (condition) {
    Executed when condition is met;
} else {
    Executed when condition is not met;
}
Executed when condition A is met, if (condition A);   * Not executed when condition A is not met
for (Expression1;Expression2;Expression3)   * Same as C language
(Expression 1)? Expression2:Expression3   * Same as C language
○Explanation for terms
The following explains terms used for explanations:
Integer multiplication Multiplication defined as "smul"
Fixed point multiplication
Arithmetic shift left is performed after integer operation. When PSR.FXP is 0, the amount of shift is 1 bit, and when PSR.FXP is 1, 2 bits.
SIMD operation straight / cross / high / low / pair
    Higher 16 bits and lower 16 bits of half word vector data is RH and RL, respectively. In the case of operations performed between Ra register and Rb register, each operation is defined as follows:
    straight    Operation is performed between RHa and RHb, and RLa and RLb
    cross    Operation is performed between RHa and RLb, and RLa and RHb
    high    Operation is performed between RHa and RHb, and RLa and RHb
    low    Operation is performed between RHa and RLb, and RLa and RLb
    pair    Operation is performed between RH and RHb, and RH and RLb (RH is 32-bit data)

[Instruction jloop, settar]

Instruction jloop is an instruction for performing a branch and setting conditional flags (predicates, here) in a loop. For example, when jloop C6, Cm, TAR, Ra the processor 1 behaves as follows, by using the address management unit 10*b* and others: (i) sets 1 to the conditional flag Cm; (ii) sets 0 to the conditional flag C6 when the value held in the register Ra is smaller than 0; (iii) adds −1 to the value held in the register Ra and stores the result into the register Ra; and (iv) branches to an address specified by the branch register (TAR) 30*d*. When not filled with a branch instruction, the jump buffer 10*f* (branch instruction buffer) will be filled with a branch target instruction. A detailed behavior is as shown in FIG. 37.

Meanwhile, Instruction settar is an instruction for storing a branch target address into the branch register (TAR) 30*d*, and setting conditional flags (predicates, here). For example, when settar C6, Cm, D9 the processor 1 behaves as follows, by using the address management unit 10*b* and others: (i) stores an address that results from adding the value held in the program counter (PC) 33 and a displacement value (D9) into the branch register (TAR) 30*d*; (ii) fetches the instruction corresponding to such address and stores the instruction into the jump buffer 10*f* (branch instruction buffer); and (iii) sets the conditional flag C6 to 1 and the conditional flag Cm to 0. A detailed behavior is as shown in FIG. 38.

These instructions jloop and settar, which are usually used in pairs, are effective for increasing the speed of a loop in prolog/epilog removal software pipelining. Note that software pipelining, which is a technique used by a compiler to increase a loop speed, allows an efficient parallel execution of a plurality of instructions by converting a loop structure into a prolog phase, a kernel phase and an epilog phase, and by overlapping each iteration with the previous and following iterations in the kernel phase.

Figures 39, 40:
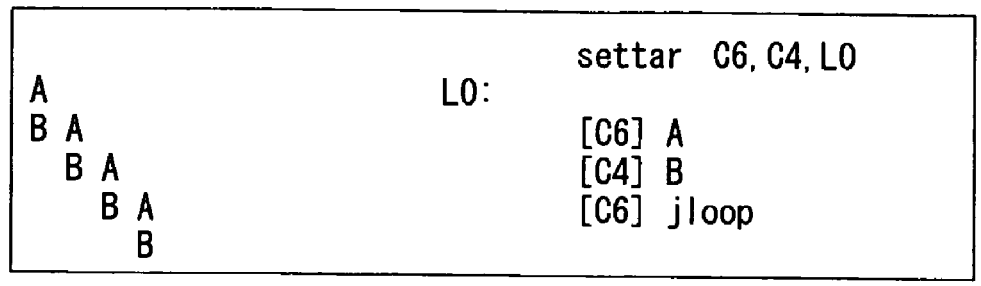
FIG. 39 is a diagram showing prolog/epilog removal 2-stage software pipelining.
FIG. 40 is a diagram showing a source program written in the C language.

As shown in FIG. 39, "prolog/epilog removal" is intended to visually remove the prolog phase and epilog phase by using the prolog phase and the epilog phase as conditional execution instructions to be performed in accordance with predicates. In prolog/epilog removal 2-stage software pipelining shown in FIG. 39, the conditional flags C6 and C4 are illustrated as predicates for an epilog instruction (Stage 2) and a prolog instruction (Stage 1), respectively.

For example, when the above-described jloop and settar instructions are used in a source program written in the C language shown in FIG. 40, a compiler generates a machine language program shown in FIG. 41 by means of prolog/epilog removal software pipelining.

As indicated by the loop part in such a machine language program (Label L00023-Instruction jloop), setting and resetting of the conditional flag C4 is carried out in an Instruction jloop and Instruction settar, respectively. Accordingly, there is no need for special instructions for such processing, thereby enabling the loop execution to end in two cycles.

Note that the processor 1 is capable of executing the following instructions which are applicable not only to 2-stage software pipelining, but also to 3-stage software pipelining: Instruction "jloop C6, C2: C4, TAR, Ra" and Instruction "settar C6, C2: C4, D9". These instructions "jloop C6, C2: C4, TAR, Ra" and "settar C6, C2: C4, D9" are equivalent to instructions in which the register Cm in the above-described 2-stage instructions "jloop C6, Cm, TAR, Ra" and "settar C6, Cm, D9" is extended to the registers C2, C3 and C4.

To put it another way, when jloop C6, C2: C4, TAR, Ra the processor 1 behaves as follows, by using the address management unit 10b and others: (i) sets the conditional flag C4 to 0 when the value held in the register Ra is smaller than 0; (ii) moves the value of the conditional flag C3 to the conditional flag C2 and moves the value of the conditional flag C4 to the conditional flags C3 and C6; (iii) adds −1 to the register Ra and stores the result into the register Ra; and (iv) branches to an address specified by the branch register (TAR) 30d. When not filled with a branch instruction, the jump buffer 10f (branch instruction buffer) will be filled with a branch target instruction. A detailed behavior is as shown in FIG. 42.

Also, when settar C6, C2: C4, D9 the processor 1 behaves as follows, by using the address management unit 10b and others: (i) stores, into the branch register (TAR) 30d, an address that results from adding the value held in the program counter (PC) 33 and a displacement value (D9); (ii) fetches the instruction corresponding to such address and stores the instruction into the jump buffer 10f (branch instruction buffer); and (ii) sets the conditional flags C4 and C6 to 1 and the conditional flags C2 and C3 to 0. A detailed behavior is as shown in FIG. 43.

FIGS. 44(a) and (b) show the role of the conditional flags in the above 3-stage instructions "jloop C6, C2: C4, TAR, Ra" and "settar C6, C2: C4, D9". As shown in (a) in FIG. 44, in prolog/epilog removal 3-stage software pipelining, the conditional flags C2, C3 and C4 serve as predicates for Stage 3, Stage 2 and Stage 1, respectively. FIG. 44(b) is a diagram showing how instruction execution is carried out when moving flags in such a case.

For example, when the above-described jloop and settar instructions shown respectively in FIGS. 42 and 43 are used in a source program written in the C language shown in FIG. 45, a compiler generates a machine language program shown in FIG. 46 by means of epilog removal software pipelining.

Note that the processor 1 is also capable of executing the following instructions which are applicable to 4-stage software pipelining: Instruction "jloop C6, C1: C4, TAR, Ra" and Instruction "settar C6, C1: C4, D9".

To put it another way, when jloop C6, C1: C4, TAR, Ra the processor 1 behaves as follows, by using the address management unit 10b and others: (i) sets the conditional flag C4 to 0 when the value held in the register Ra is smaller than 0; (ii) moves the value of the conditional flag C2 to the conditional flag C1, moves the value of the conditional flag C3 to the conditional flag C2, and moves the value of the conditional flag C4 to the conditional flags C3 and C6; (iii) adds −1 to the register Ra and stores the result into the register Ra; and (iv) branches to an address specified by the branch register (TAR) 30d. When not filled with a branch target instruction, the jump buffer 10f will be filled with a branch target instruction. A detailed behavior is as shown in FIG. 47.

Meanwhile, Instruction settar is an instruction for storing a branch target address into the branch register (TAR) 30d as well as for setting conditional flags (predicates, here).

For example, when settar C6, C1: C4, D9 the processor 1 behaves as follows, by using the address management unit 10b and others: (i) stores an address resulted from adding the value held in the program counter (PC) 33 and a displacement value (D9) into the branch register (TAR) 30d; (ii) fetches the instruction corresponding to such address and stores the instruction into the jump buffer 10f (branch instruction buffer); and (iii) sets the conditional flags C4 and C6 to 1 and the conditional flags C1, C2 and C3 to 0. A detailed behavior is as shown in FIG. 48.

For example, when the above-described jloop and settar instructions shown respectively in FIGS. 47 and 48 are used in a source program written in the C language shown in FIG. 49, a compiler generates a machine language program shown in FIG. 50 by means of epilog removal software pipelining.

FIG. 51 is a diagram showing the behavior to be performed in 4-stage software pipelining that uses jloop and settar instructions shown respectively in FIGS. 47 and 48.

In order to implement 4-stage software pipelining, the conditional flags C1-C4 are used as predicates, each of which indicates whether or not to execute an instruction. Instructions A, B, C, and D are instructions to be executed in the first, second, third, and fourth stages in the software pipelining, respectively. Furthermore, the instructions A, B, C, and D are associated with the conditional flags C4, C3, C2, and C1, respectively. Also, Instruction jloop is associated with the conditional flag C6.

Figure 52:
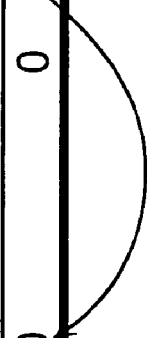
FIG. 52 is a diagram explaining an example method of setting a conditional flag C6 for Instruction jloop shown in FIG. 47.

FIG. 52 is a diagram for explaining an example method of setting the conditional flag C6 for the Instruction jloop shown in FIG. 47. This method utilizes the following characteristic: in the case where the number of software pipelining stages is "N" stages (where "N" is an integer greater than or equal to 3) when a loop to be executed is unrolled into conditional execution instructions by means of software pipelining, the loop ends in the next cycle of a cycle in which a conditional flag corresponding to the conditional execution instruction to be executed in the (N−2) th pipeline stage in the epilog phase, becomes 0.

Therefore, in the prolog phase and kernel phase in the loop processing, (i) the value of the conditional flag C6 is always set to 1, (ii) the value of the conditional flag C3 (being a conditional flag corresponding to the conditional execution instruction to be executed in the (N−2)th stage in the software pipelining) is monitored from when the epilog phase is entered, and (iii) the value of the conditional flag C3 is set to the conditional flag C6 which is in one cycle later. With the above configuration, the conditional flag C6 assigned to Instruction jloop is set to 0 at the end of the loop processing, making it possible for the processor 1 to exit from the loop. For example, in an example of the machine language program shown in FIG. 50, when the value of the conditional flag C6 becomes 0, not Instruction "jloop C6, C1: C4, TAR, R4" but Instruction "ret" being placed next to it is to be executed, which makes it possible for the processor 1 to exit from the loop.

Note that, as shown in FIG. 51, when the value of a certain conditional flag becomes 0 in the epilog phase, the value of such conditional flag remains to be 0 until the loop processing ends. This means that the conditional execution instruction corresponding to the conditional flag in question is not to be executed until the end of the loop. For example, when the value of the conditional flag C4 becomes 0 in the fifth cycle, the value of such conditional flag C4 remains to be 0 until the seventh cycle in which the loop ends. Therefore, the instruction A that corresponds to the conditional flag C4 is not to be executed from the fifth cycle to the seventh cycle.

Thus, when a conditional flag becomes 0 in the epilog phase, a control may be performed so that no instruction will be read out, until the loop processing ends, from the instruction buffer 10c (10d, 10e, and 10h) in which the instruction corresponding to such conditional flag is stored.

Meanwhile, a part of each instruction indicates the number of a conditional flag. Accordingly, the decoding unit 20 may read out only the number of a conditional flag from the corresponding instruction buffer 10c (10d, 10e, and 10h), and check the value of the conditional flag based on such read-out number, so that the decoding unit 20 will not read out instructions from the instruction buffer 10c (10d, 10e, and 10h) when the value of the conditional flag is 0.

Furthermore, as shown in FIG. 53, instructions to be executed before and after the loop may be placed respectively in the prolog and epilog phases for execution. For example, the conditional flag C5 is assigned to an instruction X to be executed immediately before the loop and to an instruction Y to be executed immediately after the loop, so as to have such instructions X and Y executed in empty stages in the epilog and prolog phases. Accordingly, it becomes possible to reduce the number of empty stages in the epilog and prolog phases.

Moreover, in the case where different instructions are executed depending on whether or not a predetermined condition is true, as in the case of an if-else statement in the C language, different conditional flags shall be used for a conditional execution instruction to be executed when the condition is true and for a conditional execution instruction to be executed when the condition is false, so that the value of each conditional flag can be changed depending on a condition. Through such simple processing, it becomes possible to realize a conditional branch instruction.

Figure 54:
FIG. 54 is a diagram explaining another example method of setting the conditional flag C6 for Instruction jloop shown in FIG. 47.

Also, the below-described method of setting the conditional flag C6 may be used instead of the method of setting the jloop instruction conditional flag C6 shown in FIG. 52. FIG. 54 is a diagram for explaining another example method of setting the conditional flag C6 for the Instruction jloop shown in FIG. 47. This method utilizes the following characteristic: in the case where the number of software pipelining stages is "N" stages (where "N" is an integer greater than or equal to 2) when a loop to be executed is unrolled into conditional execution instructions by means of software pipelining, the loop ends in the same cycle as the one in which a conditional flag corresponding to the conditional execution instruction to be executed in the (N−1) th pipeline stage in the epilog phase becomes 0.

Therefore, in the prolog phase and kernel phase in the loop processing, (i) the value of the conditional flag C6 is always set to 1, (ii) the value of the conditional flag C2 (being a conditional flag corresponding to the conditional execution instruction to be executed in the (N−1)th stage in the software pipelining) is monitored from when the epilog phase is entered, and (iii) the value of the conditional flag C2 is set to the conditional flag C6 within the same cycle. With the above configuration, the conditional flag C6 assigned to the Instruction jloop is set to 0 at the end of the loop processing, making it possible for the processor 1 to exit from the loop.

Furthermore, the below-described method of setting the conditional flag C6 may also be used. FIG. 55 is a diagram for explaining another example method of setting the conditional flag C6 for the Instruction jloop shown in FIG. 47. This method utilizes the following characteristic: in the case where the number of software pipelining stages is "N" stages (where "N" is an integer greater or equal to 4) when a loop to be executed is unrolled into conditional execution instructions by means of software pipelining, the loop ends in the cycle which is two cycles after the cycle in which a conditional flag corresponding to the conditional execution instruction to be executed in the (N−3) th pipeline stage in the epilog phase becomes 0.

Therefore, in the prolog phase and kernel phase in the loop processing, (i) the value of the conditional flag C6 is always set to 1, (ii) the value of the conditional flag C4 (being a conditional flag corresponding to the conditional execution instruction to be executed in the (N−3)th stage in the software pipelining) is monitored from when the epilog phase is entered, and (ii) the value of the conditional flag C4 is set to the conditional flag C6 which is in two cycles later. With the above configuration, the conditional flag C6 assigned to the Instruction jloop is set to 0 at the end of the loop processing, making it possible for the processor 1 to exit from the loop.

Note that software pipelining up to four stages has been explained in the present embodiment, but the present invention is also applicable to software pipelining containing five or more stages. It is possible to achieve such a configuration by increasing the number of conditional flags used as predicates.

A machine language instruction with the above-described characteristics is generated by a complier, where such machine language instruction is comprised of: a parser step of parsing a source program; an intermediate code conversion step of converting the parsed source program into intermediate codes; an optimization step of optimizing the intermediate codes; and a code generation step of converting the optimized intermediate codes into machine language instructions.

As described above, according to the present embodiment, a conditional flag for a loop is set by the use of a conditional flag for the epilog phase of software pipelining. Accordingly, there is no need to use special hardware resources such as a counter in order to judge whether or not loop processing has terminated, and it becomes possible to prevent the circuitry scale from becoming large. This contributes to a reduction in the power consumption of the processor.

Moreover, when a conditional execution instruction stops being executed in the epilog phase, such conditional execution instruction will not be executed in the software pipelining until the loop processing ends. Accordingly, there is no need to read out such a conditional execution instruction from the corresponding instruction buffer until the loop processing ends, which leads to a reduction in the power consumption of the processor.

Furthermore, by placing instructions to be executed before and after a loop in the prolog phase and the epilog phase, respectively, it becomes possible to reduce the number of empty stages in software pipelining, and therefore to execute a program at a high speed. This results in a reduction in the power consumption of the processor.

As is obvious from the above description, according to the processor of the present invention, it is possible to provide a processor whose circuitry scale is small and which is capable of high-speed loop execution while consuming a small amount of power.

Furthermore, according to the present invention, it is possible to provide a complier which is capable of generating machine language instructions that enable the processor to consume only a small amount of power.

As described above, the processor according to the present invention is capable of executing instructions while consuming only a small amount of power. It is therefore possible for the processor to be employed as a core processor to be commonly used in a mobile phone, mobile AV device, digital television, DVD and others. Thus, the processor according to the present invention is extremely useful in the present age in which the advent of high-performance and cost effective multimedia apparatuses is desired.

The invention claimed is:

1. A processor for decoding an instruction and executing the decoded instruction, said processor comprising:

a flag register in which a plurality of conditional execution flags are stored, the plurality of conditional execution flags being used as predicates for conditional execution instructions;

a decoding unit operable to decode an instruction; and an execution unit operable to execute the instruction decoded by said decoding unit, and a loop counter used for determining termination of a loop, wherein when the instruction decoded by said decoding unit is a loop instruction, said execution unit is operable to terminate an iteration of a loop to be executed, based on a value of one of the plurality of conditional execution flags for an epilog phase in the loop in a case where the loop is unrolled into the conditional execution instructions by means of software pipelining, wherein when the instruction, decoded by said decoding unit, is said loop instruction, said execution unit is further operable to set, to a first conditional execution flag of said register, a certain value indicating that an instruction using the first conditional execution flag as a predicate is to be executed, wherein said first conditional execution flag is different from said one of the plurality of conditional execution flags, and wherein said execution unit is operable to perform processing in the epilog phase, without using an epilog counter, by copying the determination result of the loop counter to the predicate of the instruction with a delay necessary for the processing in the epilog phase by executing the loop instruction.

2. The processor according to claim 1, wherein:

said flag register is further operable to store a loop flag used to judge whether or not the iteration has terminated; and said execution unit is operable to set, to the loop flag, the value of the one of the plurality of conditional execution flags for the epilog phase.

3. The processor according to claim 2, wherein said execution unit is operable to set, to the loop flag in one cycle later in the epilog phase, the value of the conditional execution flag for a conditional execution instruction to be executed in an (N−2)th pipeline stage, where N is an integer equal to or greater than 3, in a case where the number of stages in the software pipelining is N and the stages are counted each time processing in the epilog phase finishes.

4. The processor according to claim 2, wherein said execution unit is operable to set, to the loop flag in the same cycle as a cycle of the conditional execution flag in the epilog phase, the value of the conditional execution flag for a conditional execution instruction to be executed in an (N−1)th pipeline stage, where N is an integer equal to or greater than 2, in a case where the number of stages in the software pipelining is N and the stages are counted each time processing in the epilog phase finishes.

5. The processor according to claim 2, wherein said execution unit is operable to set, to the loop flag in two cycles later in the epilog phase, the value of the conditional execution flag for a conditional execution instruction to be executed in an (N−3)th pipeline stage, where N is an integer equal to or greater than 4, in a case where the number of stages in the software pipelining is N and the stages are counted each time processing in the epilog phase finishes.

6. The processor according to claim 1, further comprising an instruction buffer for temporarily storing the instruction decoded by said decoding unit, wherein said decoding unit is operable to judge whether or not the conditional execution should be executed based on the value of the one of the plurality of conditional execution flags for the epilog pulse, and not read one of the conditional execution instructions from said instruction buffer until the loop terminates, when judging that the conditional execution instruction should not be executed.

7. The processor according to claim 1, further comprising an instruction buffer for temporarily storing the instruction decoded by said decoding unit, wherein:

a part of the instruction stored in said instruction buffer indicates a storage location of the one of the plurality of conditional execution flags; and said decoding unit is operable to read the conditional execution flag stored in said flag register based on the part of the instruction stored in said instruction buffer, judge whether or not the conditional execution instruction should be executed based on the read conditional execution flag, and not read out one of the conditional execution instructions from said instruction buffer when judging that the conditional execution instruction should not be executed.

8. The processor according to claim 1, further comprising a flag assignment unit operable to assign the plurality of conditional execution flags, wherein when a conditional branch instruction is included in the loop in a source program, said flag assignment unit is operable to assign the plurality of conditional execution flags so that a conditional execution flag used as a predicate for a conditional execution instruction in a case where a condition indicated by the conditional branch instruction is met, becomes different from a conditional execution flag used as a predicate for a conditional execution instruction in a case where the condition is not met.

9. A processor for decoding an instruction and executing the decoded instruction, said processor comprising:

an instruction control unit for issuing a conditional execution instruction a decoding unit operable to decode the conditional execution instruction issued by said instruction control unit, the conditional execution instruction using a flag as a predicate for determining whether or not the conditional execution instruction is executed; and an execution unit operable to execute the conditional execution instruction decoded by said decoding unit, wherein the conditional execution instruction includes a loop instruction using a second flag as a predicate a function of the loop instruction is setting a first value to a first flag and branching to another conditional execution instruction specified by a branch address, wherein the first flag is different from the second flag and used as a predicate of one of the conditional execution instructions, and wherein when the decoding unit decodes the loop instruction in a decode stage the execution unit is operable to set a first value to the first flag in a succeeding execution stage based on a decoding result of the decode stage.

10. The processor according to claim 9,
wherein when the instruction decoded by said decoding unit is said loop instruction, said execution unit is further operable to decrement a value stored on a loop counter register.

11. The processor according to claim 10,
wherein when the instruction decoded by said decoding unit is said loop instruction and a value stored on said loop counter register becomes smaller than a certain value, said execution unit is further operable to set a second value that is different from the first value to said second flag, and
wherein the first value indicates that a conditional execution instruction is to be executed and the second value indicates that a conditional execution instruction is not to be executed.

12. The processor according to claim 11,
wherein by setting the second value to said second flag, an iteration of a loop is terminated and goes to an epilog phase in the loop in a case where the loop is unrolled into the conditional execution instructions by means of software pipelining.

13. The processor according to claim 9,
wherein said first flag is specified by said loop instruction.

14. A processor for decoding an instruction and executing the decoded instruction, said processor comprising:
an instruction control unit for issuing a conditional execution instruction;
a decoding unit operable to decode the conditional execution instruction issued by said instruction control unit, the conditional execution instruction using a flag as a predicate for determining whether or not the conditional execution instruction is executed; and
an execution unit operable to execute the conditional execution instruction, decoded by said decoding unit,
wherein the conditional execution instruction includes a loop, instruction using a third flag as a predicate, a function of the loop instruction is copying a value stored on a second flag as a predicate, a function of the loop instruction is copying a value stored on the second flag to the first flag and branching to another conditional execution instruction specified by a branch address,
wherein the first, second, and third flag are different and used as a predicate of one of the conditional execution instruction, and
wherein when the decoding unit decodes the loop instruction in a decode stage, the execution unit is operable to copy the value stored on the second flag to the first flag in a succeeding execution stage based on a decoding result of the decode stage.

15. The processor according to claim 14,
wherein when the instruction decoded by said decoding unit is said loop instruction, said execution unit is further operable to copy a value stored on a fourth flag to said second and third flag.

16. The processor according to claim 14,
wherein when the instruction decoded by said decoding unit is said loop instruction, said execution unit is further operable to decrement a value stored on a loop counter register.

17. The processor according to claim 16,
wherein when the instruction decoded by said decoding unit is said loop instruction and a value stored on said loop counter register becomes smaller than a certain value, said execution unit is further operable to set a second value that is different from a first value to said third flag, and
wherein the first value indicates that a conditional execution instruction is to be executed and the second value indicates that a conditional execution instruction is not to be executed.

18. The processor according to claim 17,
wherein by setting the second value to said third flag, an iteration of a loop is terminated and goes to an epilog phase in the loop in a case where the loop is unrolled into the conditional execution instructions by means of software pipelining.

* * * * *